(12) United States Patent
Rostami

(10) Patent No.: US 10,236,706 B2
(45) Date of Patent: **\*Mar. 19, 2019**

(54) CONFIGURABLE APPARATUS AND METHODS FOR SUPPLYING POWER AND DATA TO ELECTRONIC DEVICES

(71) Applicant: ADVANCED WIRELESS INNOVATIONS LLC, Santa Monica, CA (US)

(72) Inventor: Ramin Rostami, Calabasas, CA (US)

(73) Assignee: Advanced Wireless Innovations LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,867

(22) Filed: Aug. 22, 2016

(65) Prior Publication Data
US 2017/0047761 A1 Feb. 16, 2017

Related U.S. Application Data

(63) Continuation of application No. 14/806,637, filed on Jul. 22, 2015, now Pat. No. 9,425,637, which is a
(Continued)

(51) Int. Cl.
*H02J 1/00* (2006.01)
*H02J 3/00* (2006.01)
(Continued)

(52) U.S. Cl.
CPC .............. *H02J 7/022* (2013.01); *H01R 31/06* (2013.01); *H02J 4/00* (2013.01); *H02J 7/0042* (2013.01);
(Continued)

(58) Field of Classification Search
CPC .. H02J 2001/008; H02J 7/0042; H02J 7/0052; H02J 7/355; H02J 2007/0059; H02J 2007/0062; H02J 7/0068; H02J 7/00; H02J 7/022; Y10T 307/25; Y10T 307/625; Y10T 307/344; Y10T 307/615
(Continued)

(56) References Cited

U.S. PATENT DOCUMENTS

| 4,161,682 A | 7/1979 | Corvette |
| 4,252,007 A | 2/1981 | Kerley |

(Continued)

FOREIGN PATENT DOCUMENTS

| CN | 201142584 Y | 10/2008 |
| EP | 1746506 A1 | 1/2007 |

OTHER PUBLICATIONS

"FuelTank from CaliPod: Charge Two Phones with One Charger." Ipod and Iphone: Ipod and Iphone Accessories. Nov. 15, 2008. Web. May 10, 2016.
(Continued)

*Primary Examiner* — Carlos D Amaya
(74) *Attorney, Agent, or Firm* — Mintz Levin Cohn Ferris Glovsky and Popeo, P.C.

(57) ABSTRACT

Embodiments of a system, topology, and methods for providing electrical power to electronic devices from various power sources are described generally herein. Other embodiments may be described and claimed.

10 Claims, 19 Drawing Sheets

Related U.S. Application Data continuation of application No. 13/676,038, filed on Nov. 13, 2012, now Pat. No. 9,118,194, which is a continuation of application No. 13/460,832, filed on Apr. 30, 2012, now Pat. No. 8,310,087, which is a continuation of application No. 12/711,240, filed on Feb. 23, 2010, now Pat. No. 8,169,105.

(60) Provisional application No. 61/224,873, filed on Jul. 12, 2009.

(51) Int. Cl.
| | | |
|---|---|---|
| *H02J 7/02* | (2016.01) | |
| *H02J 4/00* | (2006.01) | |
| *H02J 7/00* | (2006.01) | |
| *H02J 7/04* | (2006.01) | |
| *H01R 31/06* | (2006.01) | |

(52) U.S. Cl.
CPC .......... *H02J 7/0045* (2013.01); *H02J 7/0052* (2013.01); *H02J 7/0068* (2013.01); *H02J 7/027* (2013.01); *H02J 7/04* (2013.01); *H02J 2001/008* (2013.01); *Y10T 307/25* (2015.04); *Y10T 307/344* (2015.04); *Y10T 307/615* (2015.04); *Y10T 307/625* (2015.04)

(58) Field of Classification Search
USPC .......................................................... 307/11
See application file for complete search history.

(56) References Cited

U.S. PATENT DOCUMENTS

| | | | |
|---|---|---|---|
| 4,564,767 | A | 1/1986 | Charych |
| 4,672,228 | A | 6/1987 | Swoboda |
| 4,860,185 | A | 8/1989 | Brewer et al. |
| 4,908,790 | A | 3/1990 | Little et al. |
| 5,237,258 | A | 8/1993 | Crampton |
| 5,243,269 | A | 9/1993 | Katayama et al. |
| 5,369,565 | A | 11/1994 | Chen et al. |
| 5,608,273 | A | 3/1997 | Bartlett |
| 5,689,412 | A | 11/1997 | Chen |
| 5,717,309 | A | 2/1998 | Cho |
| 5,847,545 | A | 12/1998 | Chen et al. |
| 5,963,140 | A | 10/1999 | Kawaguchi et al. |
| 6,194,867 | B1 | 2/2001 | Cummings et al. |
| 6,211,649 | B1 | 4/2001 | Matsuda |
| 6,285,091 | B1 | 9/2001 | Chan et al. |
| 6,304,006 | B1 | 10/2001 | Jungreis |
| 6,404,168 | B1 | 6/2002 | Shoji |
| 6,437,549 | B1 | 8/2002 | Takagishi |
| 6,455,954 | B1 | 9/2002 | Dailey |
| 6,459,175 | B1 | 10/2002 | Potega |
| 6,465,984 | B2 | 10/2002 | Fukuoka et al. |
| 6,483,204 | B2 | 11/2002 | Hanaki |
| 6,693,810 | B2 | 2/2004 | Robinson et al. |
| 6,741,064 | B2 | 5/2004 | Liu et al. |
| 6,774,603 | B2 | 8/2004 | Liao |
| 6,831,444 | B2 | 12/2004 | Kobayashi et al. |
| 6,885,115 | B2 | 4/2005 | Hatori et al. |
| 7,013,163 | B2 | 3/2006 | Jaggers et al. |
| 7,235,949 | B2 | 6/2007 | Ikeda |
| 7,573,159 | B1 | 8/2009 | Deluliis et al. |
| 7,642,671 | B2 | 1/2010 | Mahaffey |
| 7,753,713 | B2 | 7/2010 | Neale, III |
| 7,755,323 | B2 | 7/2010 | Wu |
| 7,832,645 | B2 | 11/2010 | Chen et al. |
| 7,855,528 | B2 | 12/2010 | Lee |
| 8,107,243 | B2 | 1/2012 | Guccione et al. |
| 8,143,850 | B2 | 3/2012 | Erickson |
| 8,169,105 | B2 | 5/2012 | Rostami |
| 8,310,087 | B2 | 11/2012 | Rostami |
| 8,358,107 | B2 | 1/2013 | Nguyen |
| 8,368,346 | B2 | 2/2013 | Batson et al. |
| 8,487,476 | B2 | 7/2013 | Rostami |
| 8,766,476 | B2 | 7/2014 | Rostami |
| 9,325,204 | B2 | 4/2016 | Rostami |
| 9,425,637 | B2 * | 8/2016 | Rostami ................. H01R 31/06 |
| 2002/0147698 | A1 | 10/2002 | Tree |
| 2003/0230934 | A1 | 12/2003 | Cordelli et al. |
| 2004/0073820 | A1 | 4/2004 | Hsu |
| 2004/0104707 | A1 | 6/2004 | May et al. |
| 2004/0178679 | A1 | 9/2004 | Kabasawa |
| 2004/0204179 | A1 | 10/2004 | Hsu |
| 2005/0017685 | A1 | 1/2005 | Rees et al. |
| 2005/0077869 | A1 | 4/2005 | Yueh |
| 2005/0104557 | A1 | 5/2005 | Chang |
| 2005/0174094 | A1 | 8/2005 | Purdy et al. |
| 2005/0225292 | A1 | 10/2005 | Damlamian et al. |
| 2006/0158154 | A1 | 7/2006 | Maurilus |
| 2007/0032098 | A1 | 2/2007 | Bowles et al. |
| 2007/0080663 | A1 | 4/2007 | Obering |
| 2007/0126290 | A1 | 6/2007 | Jaynes et al. |
| 2007/0205908 | A1 | 9/2007 | Du et al. |
| 2007/0247105 | A1 | 10/2007 | Krieger et al. |
| 2007/0273326 | A1 | 11/2007 | Krieger et al. |
| 2008/0084183 | A1 | 4/2008 | Hoffman et al. |
| 2008/0231233 | A1 | 9/2008 | Thornton |
| 2009/0079392 | A1 | 3/2009 | Wu |
| 2009/0089496 | A1 | 4/2009 | Huang |
| 2009/0265396 | A1 | 10/2009 | Ram et al. |
| 2009/0267562 | A1 | 10/2009 | Guccione et al. |
| 2009/0273316 | A1 | 11/2009 | Lee |
| 2009/0302802 | A1 | 12/2009 | Miyazaki et al. |
| 2010/0231161 | A1 | 9/2010 | Brown |
| 2010/0262845 | A1 | 10/2010 | Goel |
| 2011/0074340 | A1 | 3/2011 | Kao |
| 2011/0197010 | A1 | 8/2011 | Rostami |
| 2012/0191895 | A1 | 7/2012 | Rostami |
| 2014/0306539 | A1 | 10/2014 | Rostami |

OTHER PUBLICATIONS

Haselton, Todd. "Powertraveller Powergorilla Review." *Laptop Mag.* Tom's Guide, Feb. 23, 2009. Web. May 10, 2016.

* cited by examiner

CONFIGURABLE APPARATUS AND METHODS FOR SUPPLYING POWER AND DATA TO ELECTRONIC DEVICES

CROSS REFERENCE TO RELATED APPLICATIONS

The present application is a continuation of pending application Ser. No. 14/806,637, entitled "CONFIGURABLE APPARATUS AND METHODS FOR SUPPLYING POWER AND DATA TO ELECTRONIC DEVICES", and filed on Jul. 22, 2015, which is a continuation of U.S. patent application Ser. No. 13/676,038 now patented as U.S. Pat. No. 9,118,194, entitled "CONFIGURABLE APPARATUS AND METHODS FOR SUPPLYING POWER AND DATA TO ELECTRONIC DEVICES", and filed on Nov. 13, 2012, which is a continuation of U.S. patent application Ser. No. 13/460,832 now patented as U.S. Pat. No. 8,310,087, entitled "CONFIGURABLE APPARATUS AND METHODS FOR SUPPLYING POWER AND DATA TO ELECTRONIC DEVICES", and filed on Apr. 30, 2012, which is a continuation of U.S. patent application Ser. No. 12/711,240 now patented as U.S. Pat. No. 8,169,105, entitled "CONFIGURABLE APPARATUS AND METHODS FOR SUPPLYING POWER AND DATA TO ELECTRONIC DEVICES", and filed on Feb. 23, 2010, which claims priority to U.S. Provisional Patent Application No. 61/224,873, entitled "APPARATUS AND METHODS FOR PROVIDING POWER TO DC POWERABLE DEVICES VIA MULTIPLE AC SOURCE TYPES", and filed on Jul. 12, 2009 each of which is incorporated by reference.

TECHNICAL FIELD

Various embodiments described herein relate to apparatus and methods for providing electrical power and data to electronic devices.

BACKGROUND INFORMATION

It may be desirable to be able to provide power to one or more electronic devices using a configurable device coupled or uncoupled to an independent power source at various geographical locations having various AC supplies (voltages, wattages, or frequencies). The present invention provides such a device.

DETAILED DESCRIPTION

Figure 1A:
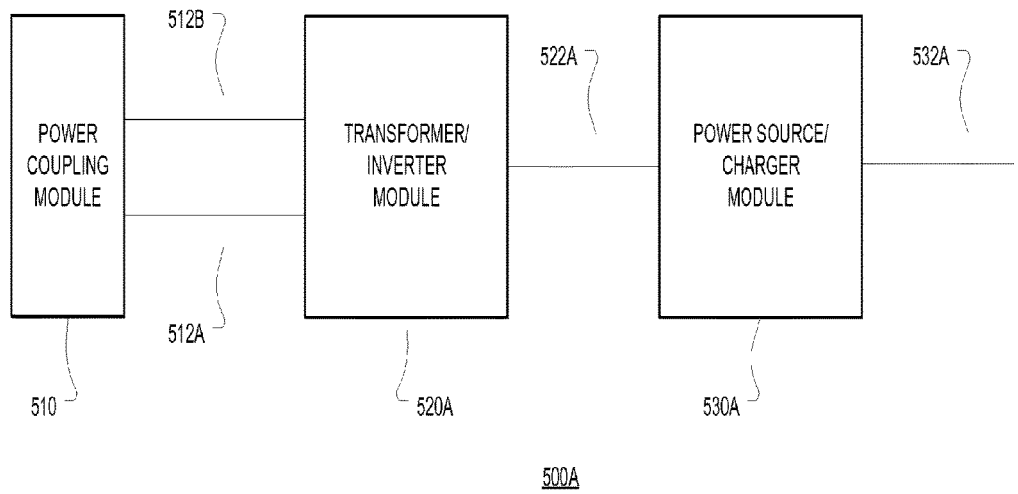
FIG. 1A is a block diagram of an EDMPS system according to various embodiments.
Figure 1B:
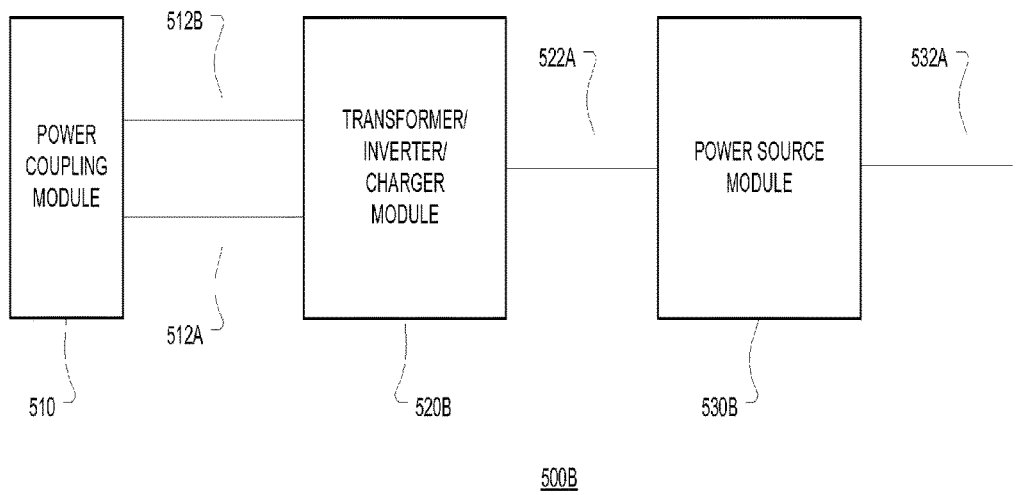
FIG. 1B is a block diagram of another EDMPS system according to various embodiments.
Figure 8A:
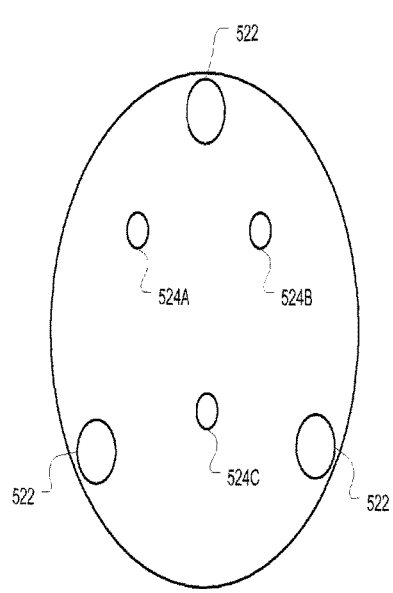
FIG. 8A is a diagram of an EDMPS element interface according to various embodiments.
Figure 8B:
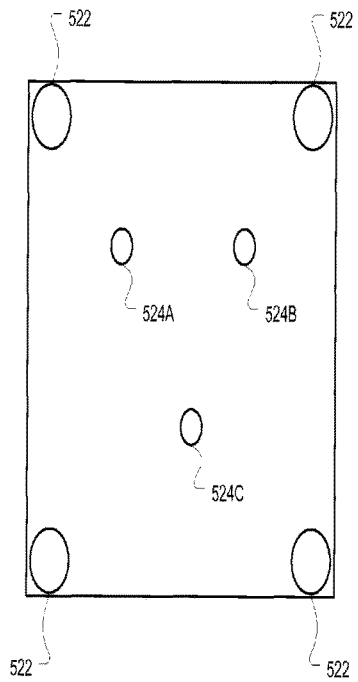
FIG. 8B is a diagram of another EDMPS element interface according to various embodiments.
Figure 9:
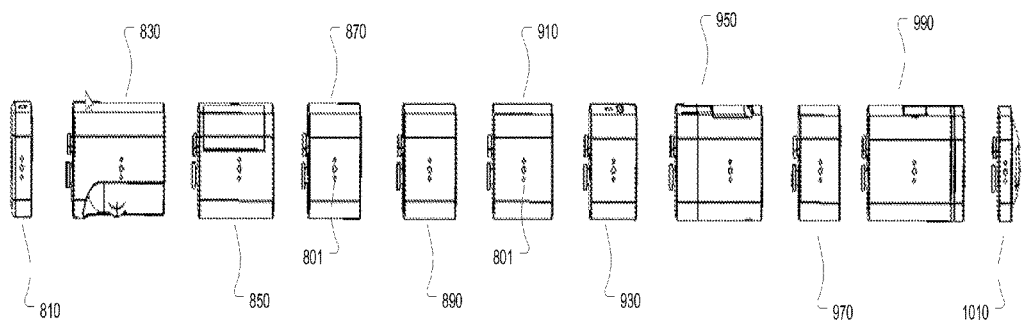
FIG. 9 is a side drawing of a configurable EDMPS system according to various embodiments.

FIG. 1A and FIG. 1B are block diagrams of EDMPS ("EDMPS") systems 500A, 500B according to various embodiments. The systems 500A, 500B may be employed in the apparatus 700 (FIG. 7) and 800 (FIG. 9). The system 500A includes a power coupling module ("PCM") 510, a transformer/inverter module ("TIM") 520A (990 in FIG. 9), and a power source and charger module ("PSCM") 530A (930 in FIG. 9). The system 500A may receive external power from an AC or DC EPS ("EPS") (20A in FIG. 3A). The PCM 510 may include one or more mechanical elements or prongs (970, 950, 830 in FIG. 9, FIG. 12A-12C, FIG. 13A-13D, FIG. 19A-19C) that may be connected to an AC source or supply or DC source or supply EPS 20A. In an embodiment the PCM 510 may be configured for different AC sources, supplies or networks that have different mechanical interfaces including the United States (US), European (EU), Asian (AS), and South African (SA) electrical networks where the voltages may range from 100 to 230 volts. In an embodiment, different AC prong modules (510A, 510B, 510C, 510D and 950, 970 in FIG. 9) may be coupable to the TIM 520A via one or more connections 512A, 512B (524A, 524B, 524C in FIG. 8A, 8B) (958A, 958B in FIG. 13A-D, 978A, 978B in FIG. 12A-12C).

Figure 12A:
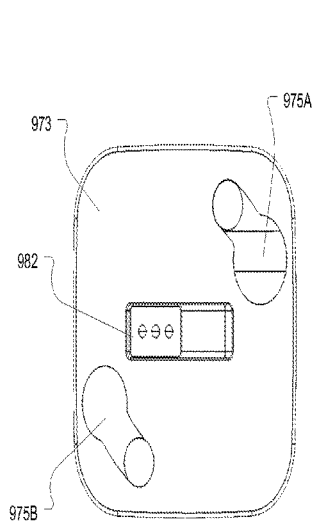
FIGS. 12A-12C are simplified drawings of an 110/120 volt, 60/50 Hz two prong plug (North and Central America and Japan AC plug) compatible element of a configurable EDMPS system according to various embodiments.
Figure 12B:
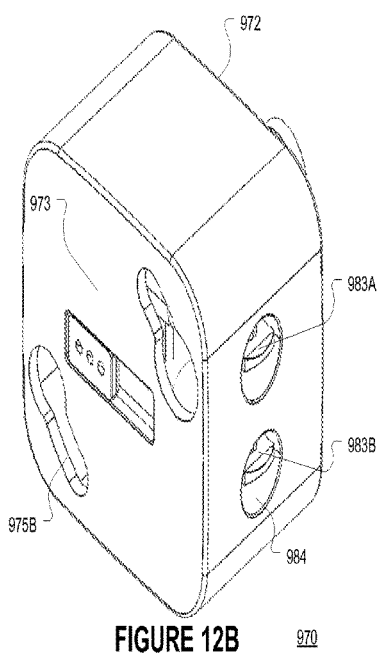
Figure 12C:
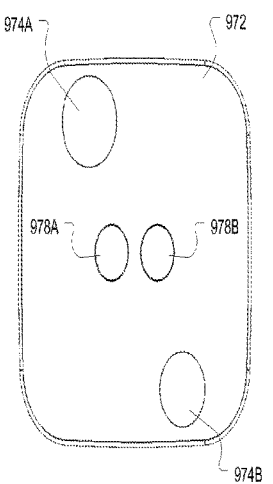

The TIM 520A may receive a electrical signal via a PCM 510, 970, 950 in FIG. 9, FIG. 12A-12C, FIG. 13A-13D and connections 512A, 512B, 958A, 958B in FIG. 13A-D, 978A, 978B in FIG. 12A-12C to convert the received electrical signal to a DC signal having a desired voltage and amperage. The module 950, 970 may work in combination with module 990 to convert the electrical signal to a desired DC signal on pin set 996A, B or 998A, B. In an embodiment, the DC signal may have about a 5-volt power supply and amperage from 100 mA to 900 mA on the pin set 998A, B and about a 50-volt power supply and amperage from 100 ma to 3 A on the pins 996A, B. In another embodiment, the DC signal may be provided on connection 522A directly to a DC powered device 30A, 30B, and coupled to a PSCM 530A. The TIM 520A may also provide a different DC signal (having another voltage or amperage) as a function a coupled charger or PSM 530A requirements (coupled module in the 800 system embodiment). The PSCM 530A may include an electrical energy storage element ("EESE") (36 in FIG. 3A, 3B, 4, 5) (within 930 in an embodiment) including a battery, capacitor, or other device capable of storing electrical energy.

Figure 8C:
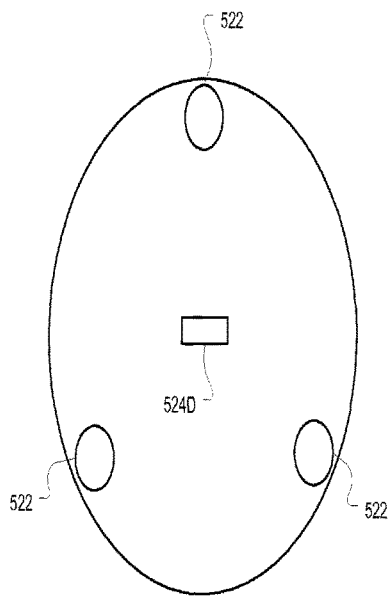
FIG. 8C is a diagram of another EDMPS element interface according to various embodiments.

The PSCM 530A, element 990 or element 930 may include a charger capable of delivering electrical energy to one or more EESE. The PSCM 530A may also generate energy for a powered electronic device ("PED") 30A, 30B and provide the signal on electronic data and electrical energy connection ("EDEEC") 532A. The EDEEC 532A may be any electrical connection including a USB female or male connection (524D in FIG. 8C) or PED specific interface, magnetic, or other connection including a propriety connector. In an embodiment the connection may be the pin pair 996A, B or 998A, B, or USB interface 1002 for apparatus 800 in FIGS. 9, 10A-C, and FIGS. 14A-C.

FIG. 1B is a block diagram of another EDMPS system 500B according to various embodiments. The system 500B may include a PCM 510, (950, 970, 830 in FIG. 9), a transformer/inverter/charger module ("TICM") 520B, and a power and data source module ("PDSM") 530B. The EDMPS system 500B may receive external power from an EPS (20A in FIG. 3A, 3B). The PCM 510, (950, 970, 830 in FIG. 9), may include one or more mechanical elements or prongs that may be connectable to an EPS. In an embodiment, the PCM 510, (950, 970 in FIG. 9), may be configured for different external AC sources or networks that have different mechanical interfaces including the United States (US), European (EU), Asian (AS), and South African (SA) networks (510A, 510B, 510C, 510D, 970, 950). In an embodiment different power coupling modules 510, (950, 970 in FIG. 9), may be coupable to the transformer/inverter/charger 520A via one or more connections 512A, 512B (524A, 524B, 524C in FIG. 8A, 8B), (958A, 958B of element 950, 978A, 978B of element 970).

The TICM 520B may receive an AC (alternating current) or DC (Direct Current) electrical signal via a PCM 510 and connections 512A, 512B and convert the received AC or DC electrical signal to a DC signal having a desired voltage and amperage. The module 950, 970 may work in combination with module 990 to convert a received electrical signal to a desired electrical signal on pin set 996A, B or 998A, B. In an embodiment, the desired electrical signal may be a direct current ("DC") signal having about a 5-volt power supply and amperage from 100 mA to 900 mA on the pin set 998A, B and about a 50-volt power supply and amperage from 100 ma to 3 A on the pins 996A, B. The desired electrical signal may be provided on connection 522A directly to a PED 30A, 30B and coupled to a PDSM 530B. The TICM 520B may also provide a different desired electrical signal (having another voltage or amperage) as a function of the PDSM requirements 530B. The PDSM 530B may include an EESE (36 in FIG. 3A, 3B, 4) including a battery, capacitor, or other device capable of storing electrical energy.

The TICM 520B (990 in FIG. 9, 10A-C) may include a charger capable of delivering electrical energy to one or more EESE of the PDSM 530B (930 in FIG. 9, 14A-C). The PDSM 530B may also generate or provide energy for a PED and provide the signal on EDEEC 532A (938A, B in FIG. 14C, 942 in FIG. 14B). The EDEEC 532A may be any electronic data or electrical connection including a USB female or male connection (524D in FIG. 8C), magnetic, or other connection including a propriety connector. In an embodiment the connection may be the pin pair 996A, B or 998A, B, or USB interface 1002 for apparatus 800 in FIGS. 9, 10A-C, and FIGS. 14A-C.

Figure 2:
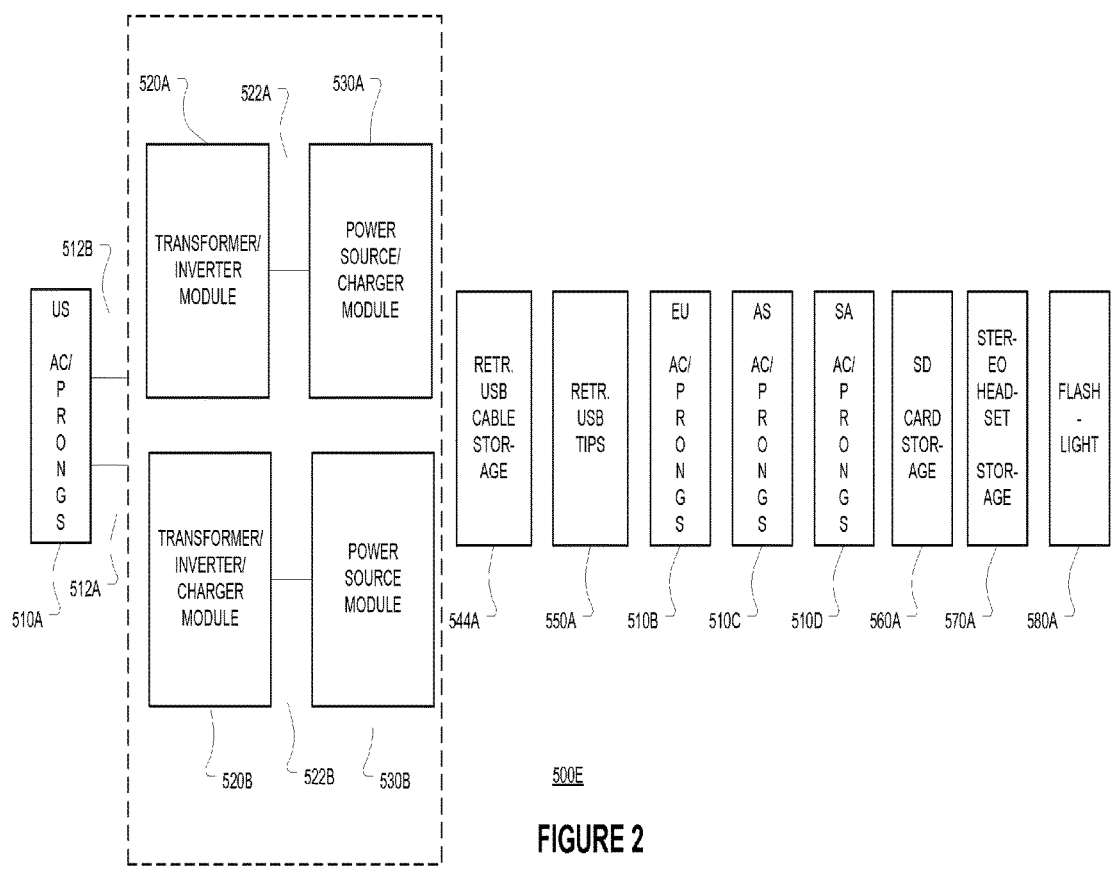
FIG. 2 is a block diagram of another EDMPS system according to various embodiments.

FIG. 2 is a block diagram of an EDMPS system 500E according to various embodiments. The EDMPS system 500E includes an alternating current US (AC) prong PCM 510A, one of a combination of a TIM 520A and a PSCM 530A and a combination of a TICM 520B and a PDSM 530B. The combination of a TIM 520A and a PSCM 530A is described above with reference to 1A. The combination of a TICM 520B and a PDSM 530B is described above with reference to 1B.

The EDMPS system 500E may include additional modules including a retractable USB cable storage module 544A, retractable USB cable tips module (850 in FIG. 9, 18A-18C), EU prong module 510B (950 in FIG. 9, 13A-13D), AS prong module 510C, SA prong module 510D, secure digital ("SD") card storage module 570A, and flashlight module 580A (810 in FIG. 9, 20A-20C). The retractable USB cable storage module 544A, may include a recess capable of holding a USB cable or a retractable USB cable. The retractable USB tip module 550A, 850 may include multiple connectable tips that may be coupled to a cable or interface to enable the cable or interface to be coupled to an PED 30A, 30B having different connections 524D including propriety connections.

The EDMPS system 500E may also include a European (EU) prong module 510B, 950, an Asian (AS) prong module 510C, and a South African (SA) prong module 510D. The secure digital (SD) card storage module 560A may include one or more recesses to hold micro or standard size secure digital or other memory cards. A stereo headset storage 570A (910 in FIG. 9, 15A-15C) may include a recess to hold a stereo headset (570C in FIG. 7, 919A, B in FIG. 15A) and a spindle (570B in FIG. 7, 916B in FIG. 15A, 15B). The headset 570C, 919A,B may be wound about the spindle 570B, 916B and the combined headset 570C, 919A,B and spindle 570B, 916B may be stored in the recess 570A, 916A which may further include a cap 570A. The EDMPS system 500E may also include a flashlight 580A, 810.

The flashlight 580A, 810 may include one or more light elements including incandescent, LED, or electroluminescent element. The flashlight 580A, 810 may include a male or female connector 524A, 524B, 524C, or 524D or flat connector 818A, B in FIG. 20A that may couple with one of the PSCM 530A (930 in FIG. 9), the PDSM 530B, the TIM 520A (990 in FIG. 9), and the TICM 520B. The PSCM 530A (930 in FIG. 9), the PDSM 530B, the TIM 520A (990 in FIG. 9), and the TICM 520B may provide electrical energy to the one or more lighting elements of the flashlight or lighting module 580A, 810. In an embodiment the lighting module 580A, 810 may also include an EESE 36 to power the one or more lighting elements independent of the PSCM 530A (930 in FIG. 9), the PDSM 530B, the TIM 520A (990 in FIG. 9), and the TICM 520B.

Figure 3A:
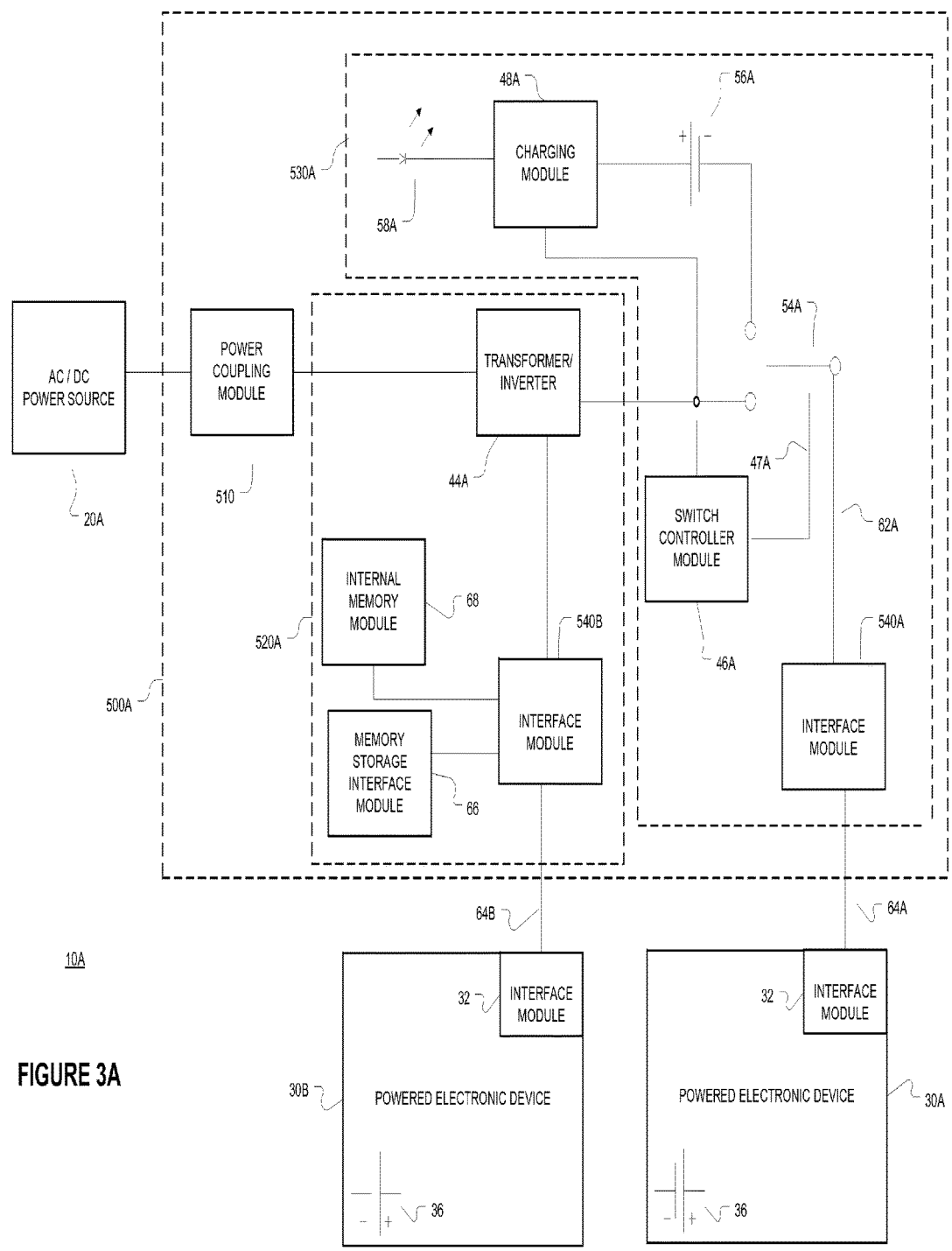
FIG. 3A is a block diagram of an architecture including a first EDMPS element according to various embodiments.

FIG. 3A is a block diagram of an architecture 10A including an EDMPS system 500A according to various embodiments. The architecture 10A includes an EPS 20A, an EDMPS system 500A, and several PED 30A, B. The PED 30A, 30B may be powered by an electronic data and electrical energy interface module ("EDEEIM") 540B, 540A (FIG. 3A, 3B), 340A, 340B (FIG. 4) 340A, 340B (FIG. 5). The PED 30A, 30B may be coupled to an EDMPS system 500A, 500B, 500C, 500D via cable(s) 64A, 64B coupling the PED 30A, 30B electronic data and electrical energy interface module ("EDEEIM") 32 to an EDMPS 500A, 500B, 500C, 500D, 870, 890, 930, 990 EDEEIM 540B, 540A (FIG. 3A, 3B), 340A, 340B (FIG. 4) 340A, 340B (FIG. 5). The EDMPS system 500A, 500B, 870, 890, 930, 970, 990 may provide desired electrical energy to one or more PEDs 30A, 30B via the EDEEIM 32, 942.

In an embodiment a PED 30A, 30B may include a rechargeable EESE 36. The EDMPS system 500A, 500B, 870, 890, 930, 970, 990 may provide desired electrical energy to one or more PEDs 30A, 30B via the EDEEIM 32, 132, 32A, 32B, 942, 880A, 1002 that is sufficient to a) power the PED 30A, 30B, b) charge an EESE 36 of a PED 30A, 30B, and c) simultaneously power a PED 30A, 30B and charge an EESE 36 of a PED 30A, 30B. The EESE 36 may be a rechargeable battery, capacitor, or other device capable of temporarily storing electrical energy.

Figure 13A:
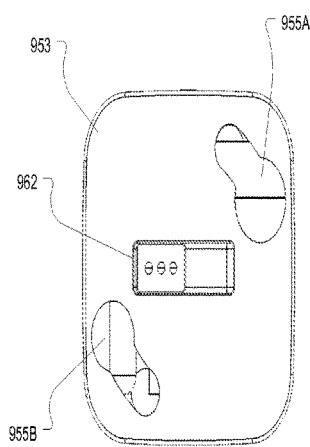
FIGS. 13A-13D are simplified drawings of a 230 volt, 50 Hz three prong plug (United Kingdom, Ireland, Cyprus, Malta, Malaysia, Singapore and Hong Kong format AC plug) and two prong plug (Europe except UK) element of a configurable EDMPS system according to various embodiments.
Figure 13B:
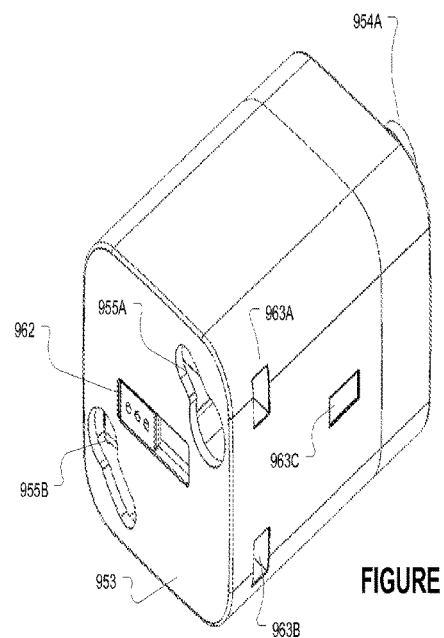
Figure 13C:
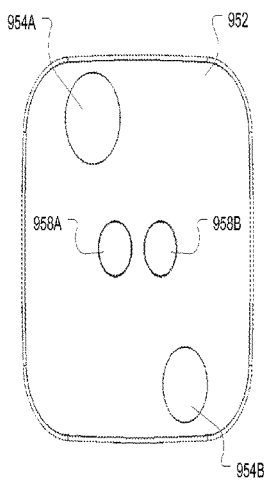
Figure 13D:
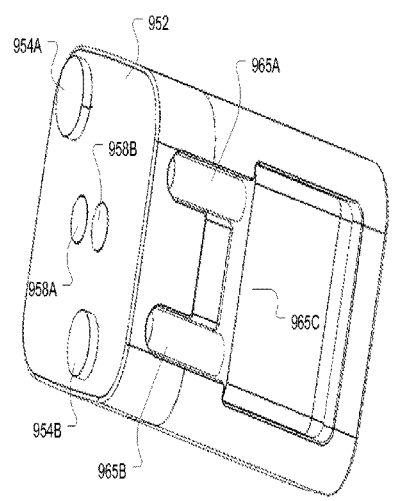

In an embodiment, the EDMPS system 500A of FIG. 3A may include a PCM 510, a TIM 520A, and PSCM 530A. The PSCM 530A may include a switch controller module 46A, a charging module 48A, an EDEEIM 540A, a multiple position switch 54A, an EESE 56A, and one or more user detectable signal generation modules ("UDSGM") 58A. The EPS 20A may supply external electrical power. The EPS 20A may be part of an electrical distribution network, independent electrical source, or localized electrical source including a battery 56A, generator, or solar generation module. The PCM 510 may include multiple electrical contacts (510A, 510B, 510C, and 510D, 998A, B, 938A, 938B, 880A, 900A) that enable a EDMPS 500A to receive electrical energy from an EPS 20A. In an embodiment, the EPS 20A may supply external electrical power to the PCM 510 via a standard outlet where the power coupling includes two electrical connectors for a non-grounded application and three electrical connections for a grounded application as a function of the EPS, such as prongs 938A, 938B (FIG. 12B), 965A, 965B (FIG. 13D), 963A, 963B, 963C (FIG. 13B).

The TIM 520A may receive external electrical power and convert the received electrical power to a desired power signal having a predetermined voltage and amperage as needed or required by one or more PEDs 30A, and 30B. The TIM 520A may also provide electrical energy to an EDEEIM 540B where the electrical energy may be the same as the desired electrical power provided to or to be provided to PEDs 30A, and 30B. The interfaces 540B, 540A may be universal serial bus (USB) compatible interfaces or specific to one or more PED 30A, 30B.

The TIM 520A (990 in FIG. 9) may include a data memory storage interface ("DMSI") 66 that may interface with one or more DMSI including a compact flash card, secure digital (SD), miniSD, microSD, SD high capacity (SDHC), miniSDHC, microSDHC, SD extended capacity, and memory stick. The DMSI 66 may conform to the SD input-output (SDIO) standard to enable a data memory card and other devices to communicate electronic data with and through a PED 30A, 30B via the EDEEIM 32. The TIM 520A may also include internal, non-volatile and volatile electronic data memory ("IDM") 68 where the electronic data may be communicated with a PED 30A, 30B via the EDEEIM 32.

The PSCM 530A may include a UDSGM 58A, charging module 48A, EESE 56A, multiple position switch ("MPS") 54A, switch controller module ("SCM") 46A, and electronic data and electrical energy interface module ("EDEEIM") 540A. The PSCM 530A may receive electrical energy from the TIM 520A. The electrical energy may be received by the charging module 48A, SCM 46A and MPS 54A. The SCM 46A may detect when sufficient energy is provided by TIM 520A and direct the electrical energy to the EDEEIM 540A (MPS 54A in lower position) via the MPS 54A control line. Otherwise the SCM 46A may direct electrical energy from the EESE 56A (MPS 54A in upper position) via the MPS 54A control line 47A to the EDEEIM 540A when insufficient energy is provided by the TIM 520A.

The charging module 48A may receive electrical energy from the TIM 520A and charge one or more EESE 56A. The charging module 48A may provide an electrical signal to the one or more UDSGM 58A to inform a user when the EESE 56A is being charged, discharged, external power is present, and when one or more PEDs 30A, and 30B are electrically coupled to a PSCM 530A. The EESE 56A may include one or more batteries, capacitors, or other electrical energy storage devices. The SCM 46A may work in conjunction with the MPS 54A to direct electrical energy from one of the TIM 520A and the EESE 56A to the EDEEIM 540A via the coupling 62A.

Figure 3B:
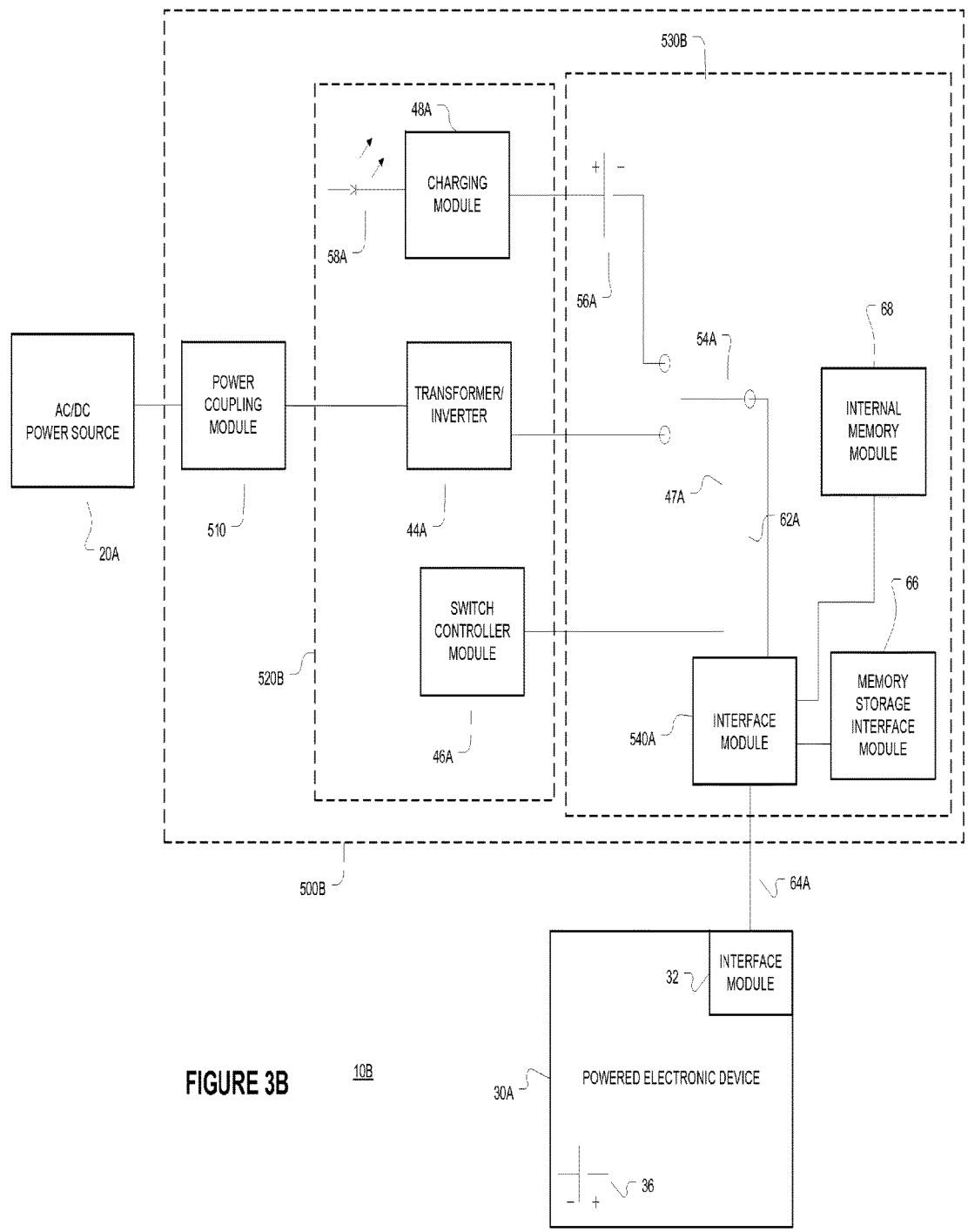
FIG. 3B is a block diagram of another architecture including a second EDMPS element according to various embodiments.

FIG. 3B is a block diagram of an architecture 10B including the EDMPS 500B according to various embodiments. The architecture 10B may include an EPS 20A, the EDMPS 500B, and a PED 30A. The PED 30A may be powered by the EDEEIM 540A. In an embodiment, the EDMPS 500B of FIG. 3B may include a PCM 510, a TICM 520B, and PDSM 530B. The TICM 520B may include a SCM 46A, a charging module 48A, a transformer/inverter 44A, and one or more UDSGM 58A. The PDSM 530B may include an EDEEIM 540A, a MPS 54A, an IDM 68, an DMSI 66, and an EESE 56A.

The EPS 20A may supply external AC or DC electrical energy or power. The PCM 510 may provide electrical energy to the transformer/inverter 44A of the TICM 520B where electrical energy may be the same as the electrical power provided to or to be provided to PEDs 30A, 30B or another electrical signal including an AC or DC signal having various waveforms. The transformer/inverter 44A may provide electrical energy as required by the charging module 48A. The transformer/inverter 44A may also provide an electrical signal to the SCM 46A where the electrical signal represents the energy level of the electrical signal received from the PCM 510 to the TICM 520B.

The charging module 48A may receive electrical energy from the transformer/inverter 44A and charge one or more EESE 56A by providing a controlled electrical signal to the PDSM 530B. The charging module 48A may also provide an electrical signal to the one or more UDSGM 58A to inform a user when a EESE 56A is being charged or discharged, external power is present from a PCM 510, and when one or more PEDs 30A, 30B are electrically coupled to the PDSM 530B. The EESE 56A may include one or more batteries, capacitors, or other electrical energy storage devices. The SCM 46A may work in conjunction with the MPS 54A to direct electrical energy from one of the transformer/inverter 44A and the EESE 56A to the EDEEIM 540A via the coupling 62A. The SCM 46A may control the switch 54A as a function of the electrical signal received from the transformer/inverter 44A via the switch control line 47A.

As noted, the EDMPS 500A, 500B, 500C, 500D, 500E may provide desired electrical energy to one or more PEDs 30A, 30B via the EDEEIM 32A, 32B. In an embodiment the EDEEIM 540A may receive an electrical signal on line 62A from the MPS 54A and provide the electrical signal on the appropriate electrical contacts of the EDEEIM to provide desired electrical power via an electrical connection 64A to the PED 30A, 30B EDEEIM 32. The PDSM 530B may also communicate electronic data between the IDM 68 and the DMSI 66 to a PED 30A, 30B via the respective EDEEIM 540A AND 32.

Figure 4:
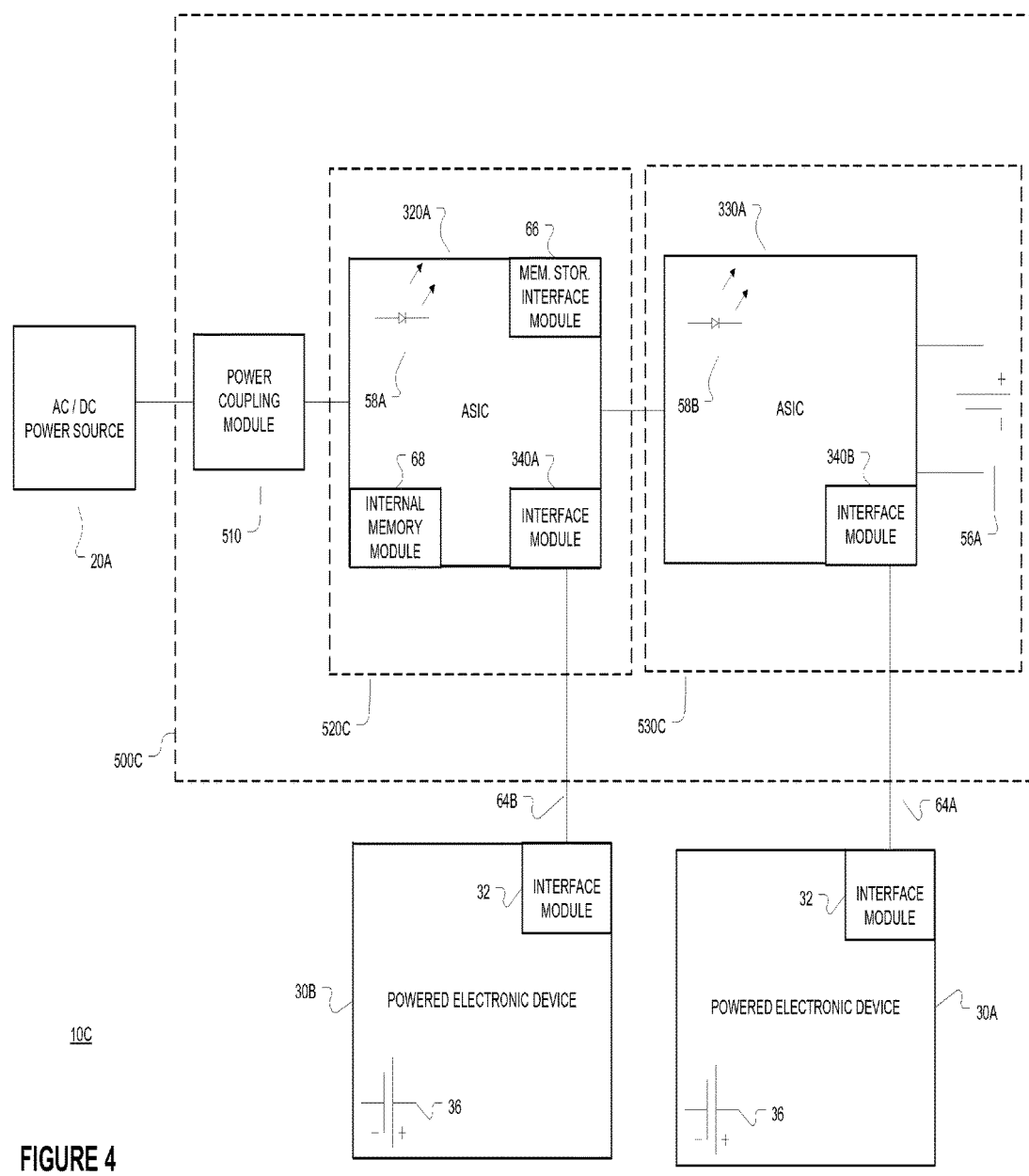
FIG. 4 is a block diagram of an architecture including an EDMPS element according to various embodiments.
Figure 5:
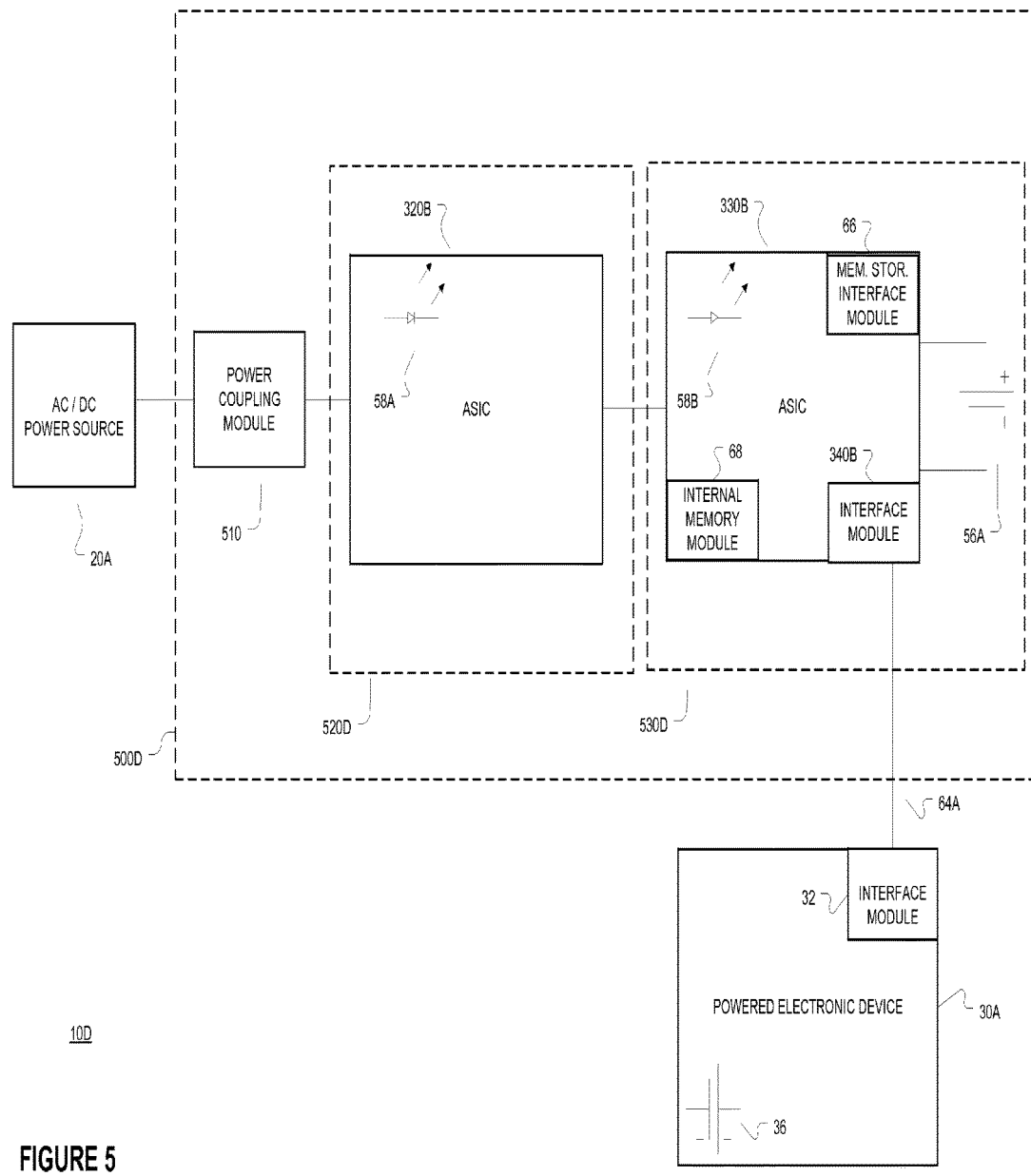
FIG. 5 is a block diagram of an architecture including another EDMPS element according to various embodiments.

FIG. 4 is a block diagram of another EDMPS 500C according to various embodiments. A PED 30A, 30B in the architecture 10C may have a EDEEIM 32. The EDMPS 500C may include a PCM 510, a TIM 520C, and a PSCM 530C. The TIM 520C and the PSCM 530C may each include an application specific integrated circuit (ASIC) 320A, 330A respectively. The TIM 520C ASIC 320A may perform the functions of the transformer/inverter 44A, the DMSI 66, the IDM 68, and the EDEEIM 340A as described in reference to EDMPS 500A TIM 520A.

The TIM 520C ASIC 320A may further include a UDSGM 58A where the UDSGM 58A provides an indication of data transfer between the IDM 68 or DMSI 66 and the EDEEIM 340A. The PSCM 530C ASIC 330A may perform the functions of the charging module 48A, SCM 46A, MPS 54A, UDSGM 58B, and the EDEEIM 340A as described in reference to EDMPS 500A PSCM 530A. The PSCM 530C may also include a EESE 56A that is coupled to the ASIC 330A. In an embodiment, the EDMPS 500C EDEEIM 340A, 340B may be one of a male or female based electrical contact interface and the PED 30A, 30B EDEEIM 32 may be one of a female or male interface, respectively.

FIG. 5 is a block diagram of another EDMPS 500D according to various embodiments. A PED 30A in the architecture 10D may include an EDEEIM 32. The EDMPS 500D may include a PCM 510, a TICM 520D, and a PDSM 530D. The TICM 520C and the PDSM 530D may each include an application specific integrated circuit (ASIC) 320B, 330B respectively. The TICM 520D ASIC 320B may perform the functions of the transformer/inverter 44A, the charging module 48A, the SCM 46A, and the UDSGM 58A as described in reference to EDMPS 500B TICM 520B.

The PDSM 530D ASIC 330B may perform the functions of the DMSI 66, the IDM 68, the MPS 54A, and the EDEEIM 540A as described in reference to EDMPS 500B PDSM 530B. The PDSM 530D may also include a EESE 56A that is coupled to the ASIC 330B. The PDSM 530D ASIC 320A may further include a UDSGM 58B where the UDSGM 58B provides an indication of data transfers between the IDM 68 or DMSI 66 and the EDEEIM 340A. In an embodiment, the EDMPS 500D EDEEIM 340A may be one of a male or female based electrical contact interface and the PED 30A EDEEIM 32 may be one of a female or male interface, respectively.

Figure 6:
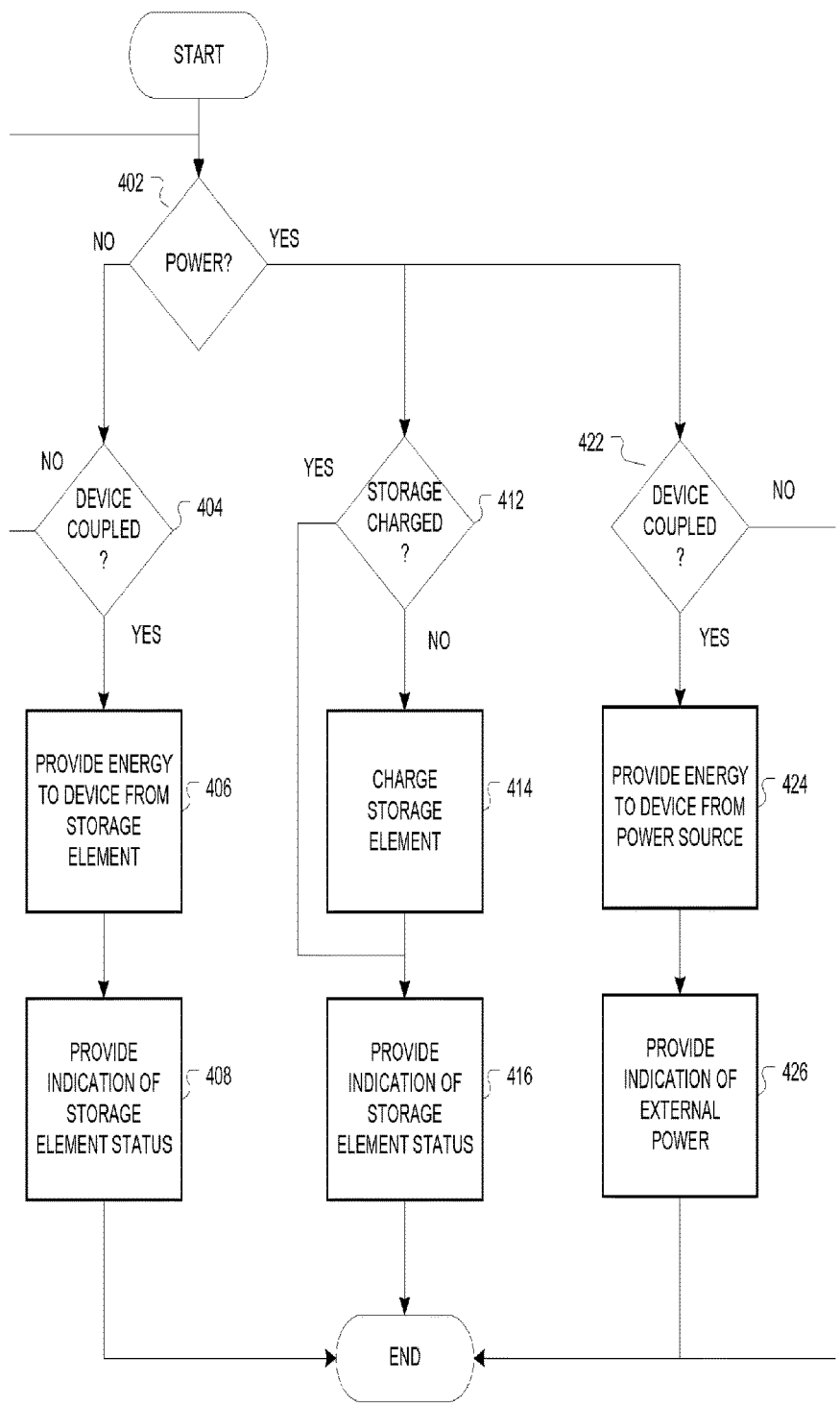
FIG. 6 is a flow diagram illustrating several methods according to various embodiments.

FIG. 6 is a flow diagram illustrating several methods 400 according to various embodiments. An ASIC 330A, 320B may employ the method 400 illustrated by the FIG. 6 flow diagram. The method 400 may determine whether sufficient power is being provided by an EPS 20A to power one or more PED 30A, 30B (activity 402). When the power is insufficient and at least one device (PED 30A, 30B) is coupled to a EDMPS 500C, 500D (activity 404), the method 400 may provide energy to the one or more devices (PED) 30A, 30B from an EESE 56A (activity 406) and provide an indication of the EESE 56A status via a UDSGM 358A (activity 406, 408).

When sufficient power is provided by a EPS 20A and EESE 56A is not fully charged (activity 412) the method 400 may charge the EESE 56A (activity 414) and provide an indication of the EESE 56A charge level via the UDSGM 358A (activity 416). Further, when sufficient power is provided by a EPS 20A (activity 402) and at least one device (PED) 30A, 30B is coupled to an EDEEIM 340A, 340B (activity 422), the method 400 may provide electrical energy to the one or more devices (PED) 30A, 30B from the EPS 20A (activity 424) and provide an indication of the existence of power from the EPS 20A via the UDSGM 358A (activity 426).

Figure 7:
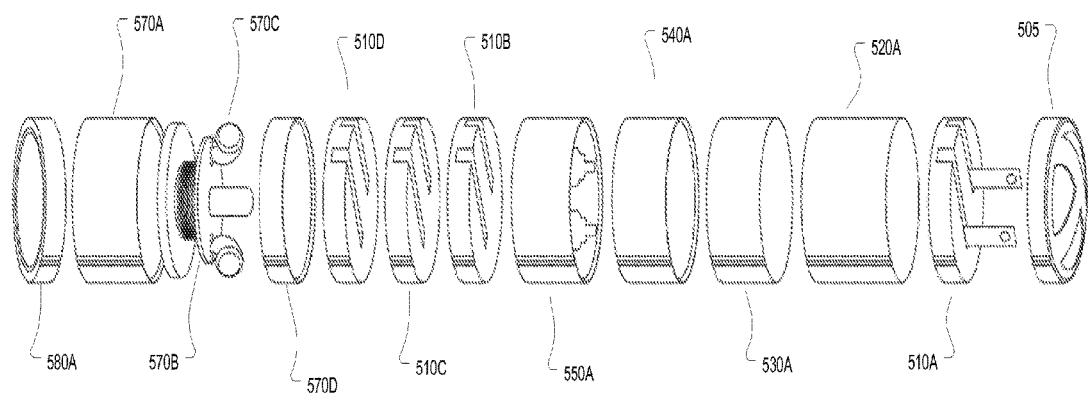
FIG. 7 is a partial drawing of an EDMPS system according to various embodiments.

FIG. 7 is a block diagram of an EDMPS architecture 700. The architecture 700 includes a US prong module 510A, a transformer/inverter 520A, a power source/charger 530A, a USB cable receptacle 540A, a USB cable tip receptacle 550A, an EU prong module 510B, an AS prong module 510C, an SA prong module 510D, a stereo headset receptacle 570A, and a light element 580A. The stereo receptacle may include a spindle 570B to wrap the stereo headset 570C thereon. The stereo receptacle 570A may include a cap 570D. The elements of the EDMPS system 500A, 500B, 500C, 500D and 700 may be coupled together via mechanical or magnetic connections such as the connections 522 shown in FIGS. 8A, 8B, and 8C. One or more elements of the 500A, 500B, 500C, 500D, and 700 may be coupled electrically via one or more electrical couplings 524A, 524B, 524C, and 524D.

FIG. 9 is a side drawing of a configurable EDMPS system 800 according to various embodiments that includes eleven repositionable and configurable modules 810, 830, 850, 870, 890, 910, 930, 950, 970, 990, and 1010. Each module may include a registration marker 801 to aid mechanically coupling between modules. The system 800 may include a focused light generation module ("FLGM") 810, a car or airplane DC PCM 850, a low voltage, wattage charger module ("LVCM") 870, a high voltage, wattage charger module ("HVCM") 890, a headphone storage module ("HSM") 910, a PSCM 930, a United Kingdom (UK) or European (EU) AC PCM 950, a United States (US) AC PCM 970, a TIM 990, and an end-cap module 1010.

Figures 10A, 10B, 10C:
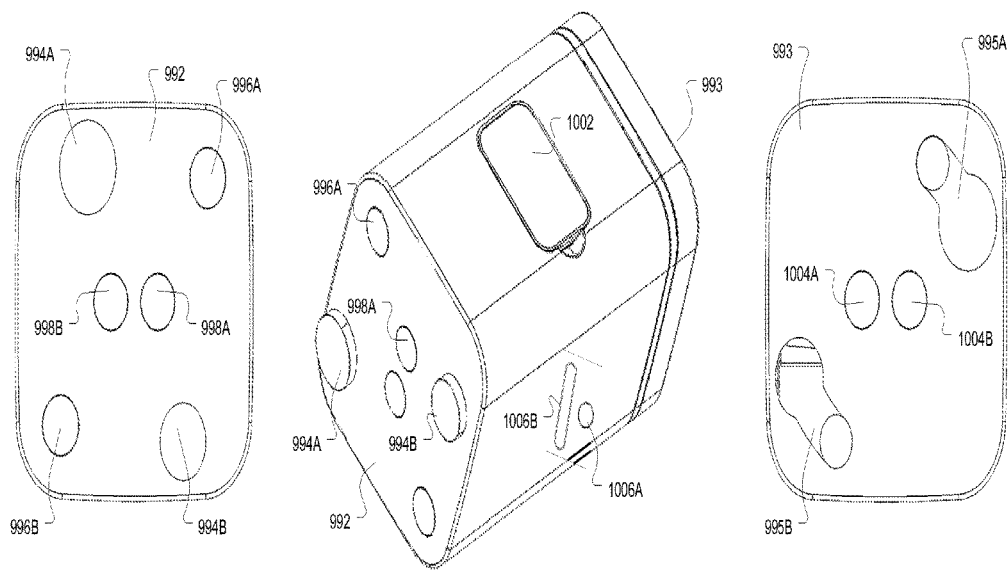
FIGS. 10A-10C are simplified drawings of a power converter, USB interface, and memory card interface element of a configurable EDMPS system according to various embodiments.

FIGS. 10A-10C are simplified drawings of a TIM 990 (520A in FIG. 3A and 520C in FIG. 4) of a configurable EDMPS system 900 according to various embodiments. The TIM 990 has a top, female-type mechanical and electrical connector ("TFMEC") 993, a bottom, male-type mechanical and electrical connector ("BMMEC") 992, a EDEEIM 1002, a DMSI 1006B, and a UDSGM 1006A. The TFMEC 993 may include multiple female mechanical connections or opening pair ("FMCP") 995A, 995B where the one opening 995A is larger than the other opening 995B to orient the pair 995A, 995B with a corresponding male mechanical connector pair ("MMCP").

The TFMEC 993 further includes an electrical energy connection pair ("EECP") 1004A, 1004B. The EECP 1004A, 1004B may be mechanically and electrically couplable to a PCM 510 including the PCM 830, 950, and 970 and the PSCM 930. The BMMEC 992 may include multiple male mechanical connections or pair ("MMCP") 994A, 994B where the one element 994A is larger than the other element 994B to orient the pair 994A, 994B with a corresponding female mechanical connector pair. The BMMEC 992 further includes an inner EECP 998A, 998B and an outer EECP 996A, 996B. In an embodiment the inner EECP 998A, 998B may have a lower wattage range (about 5-volt with amperage from 100 mA to 900 mA) then the outer EECP 996A, 996B (about 50-volts with amperage from 100 mA to 3 A).

The inner EECP 998A, 998B may be mechanically and electrically couplable to the FLGM 810, LVCM 870, and PSCM 930. The outer EECP 996A, 996B may be mechanically and electrically couplable to the HVCM 890. In an embodiment the EDEEIM 1002 may be USB compatible, the DMSI 1006B may be SD memory interface compatible, and the UDSGM 1006A may include at least one light emitting diode (LED). The EDEEIM 1002 may provide electrical power and data to a PED 30A, 30B coupled to the EDEEIM 1002.

The TIM 990 may receive electrical energy from the EECP 1004A, B and transform or invert the signal (depending on whether PCM 830, 950, 970 provides an AC or DC signal and its voltage level). The TIM 990 may provide the lower wattage signal on the inner EECP 998A, B and a higher wattage electrical signal on the outer EECP 996A, B where the signals may be DC signals.

Figure 11A:
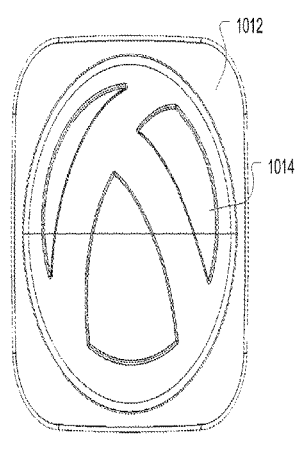
FIGS. 11A-11C are simplified drawings of an end cap element of a configurable EDMPS system according to various embodiments.
Figure 11B:
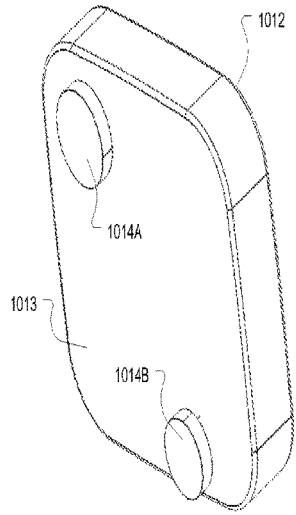
Figure 11C:
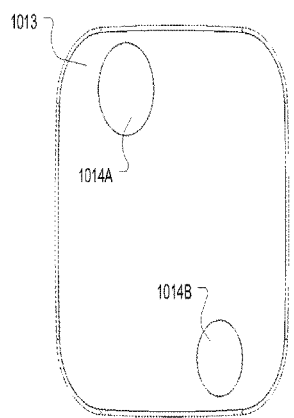

FIGS. 11A-11C are simplified drawings of an end cap module 1010 of the configurable EDMPS system 800 according to various embodiments. The end-cap module 1010 may include a logo 1014 on a top surface 1012 and a BMMEC 1013. The BMMEC 1013 may include multiple male mechanical connections or pair ("MMCP") 1014A, B where the one element 1014A is larger than the other element 1014B to orient the pair 1014A, 1014B with a corresponding female mechanical connector pair including with the FLGM 830, the TIM 990, the PCM 970, the PCM 950, the PCM 830, and the PSCM 930.

FIGS. 12A-12C are simplified drawings of an 110/120 volt, 60/50 Hz two prong plug (North and Central America and Japan AC plug) PCM 970 of a configurable EDMPS system 800 according to various embodiments. The PCM 970 has a TFMEC 973, a BMMEC 972, an extendable, recessed US and Japan style AC outlet prong pair 983A, B and prong pair extension slide 982. The TFMEC 973 may include multiple FMCP 975A, B where the one opening 975A is larger than the other opening 975B to orient the pair 975A, 975B with a corresponding MMCP. The TFMEC 973 includes the prong pair extension slide 982 where a user may advance the prong pair 983A, B from within the PCM 970 or slide the prong pair 983A, B back into the PCM 970.

Figure 21:
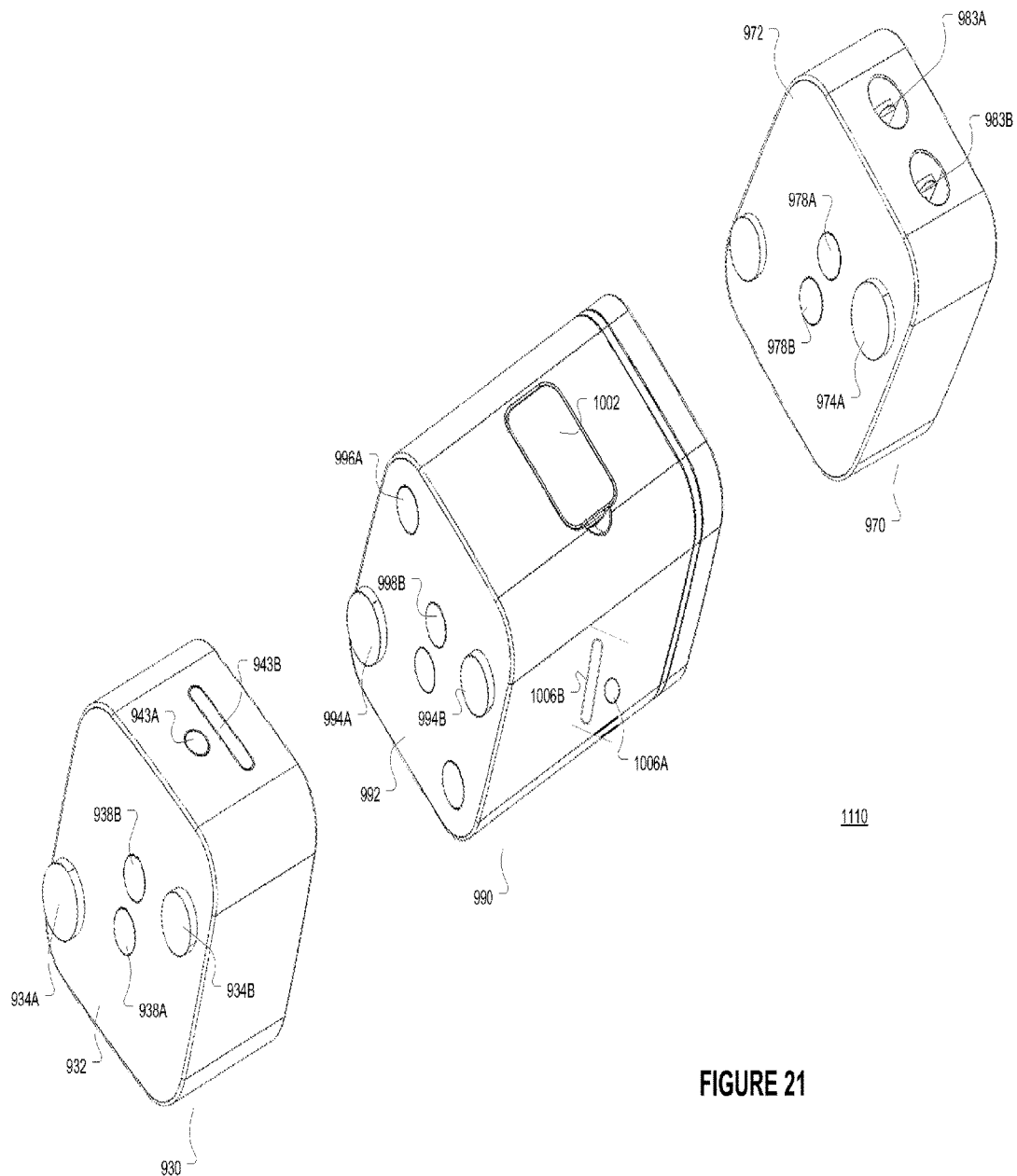

The BMMEC 972 may include MMCP 974A, B where one connector 974A is larger than the other connector 974B to orient the pair 974A, B with the TIM 990 corresponding female mechanical connector pair 995A, B. The BMMEC 992 further includes an inner EECP 978A, B. The EECP 978A, B may be electrically coupled to the TIM 990 EECP 1004A, B. The PCM 970 may provide external electrical power to the TIM 990 via the EECP 1004A, B. The PCM 970 may provide about 100 to 110-volt, 50-60 Hz electrical signals to the TIM 990 when the PCM 970 is coupled to an appropriate EPS 20A and coupled to the TIM 990 (as shown in FIG. 21, 1110). The TIM 990 BMMEC 992 may be simultaneously coupled to the PSCM 930 (as shown in FIG. 21, 1110), HVCM 890 (FIG. 24, 1140), or LVCM 870 (FIG. 25, 1150).

FIGS. 13A-13D are simplified drawings of a 230 volt, 50 Hz three prong plug (United Kingdom, Ireland, Cyprus, Malta, Malaysia, Singapore and Hong Kong format AC plug) and two prong plug (Europe except UK) PCM 950 of a configurable EDMPS system 800 according to various embodiments. The PCM 950 has a TFMEC 953, a BMMEC 952, an extendable, recessed UK style AC outlet three prong set 963A, B, C, a rotatably extendable EU style AC outlet two prong pair 965A, B, and a three prong set extension slide 962. The TFMEC 953 may include multiple FMCP 955A, B where the one opening 955A is larger than the other opening 955B to orient the pair 955A, 955B with a corresponding MMCP. The TFMEC 953 includes the UK three prong set extension slide 962 where a user may advance the UK three prong set 963A, B, C from within the PCM 950 or slide the three prong set 963A, B, C back into the PCM 950. The EU two-prong pair 965A, B may rotatably extended from within and back within the PCM 950.

The BMMEC 952 may include MMCP 954A, B where one connector 954A is larger than the other connector 954B to orient the pair 954A, B with the TIM 990 corresponding female mechanical connector pair 995A, B. The BMMEC 952 further includes an inner EECP 958A, B. The EECP 958A, B may be electrically coupled to the TIM 990 EECP 1004A, B. The PCM 950 may provide external electrical power to the TIM 990 via the EECP 1004A, B. The PCM 950 may provide about 230-volt, 50 Hz electrical signals to the TIM 990 when the PCM 950 is coupled to an appropriate EPS 20A and coupled to the TIM 990 similar to PCM 970 as shown in FIG. 21, 1110. The TIM 990 BMMEC 992 may be simultaneously coupled to the PSCM 930 (as shown in FIG. 21, 1110), HVCM 890 (FIG. 24, 1140), or LVCM 870 (FIG. 25, 1150).

Figure 14A:
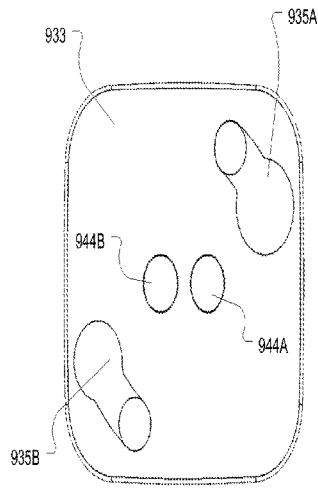
FIGS. 14A-14C are simplified drawings of an energy storage and mini-USB interface element of a configurable EDMPS system according to various embodiments.
Figure 14B:
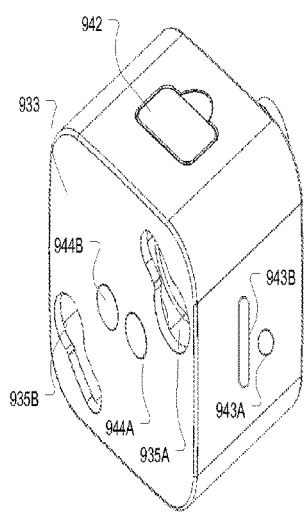
Figure 14C:
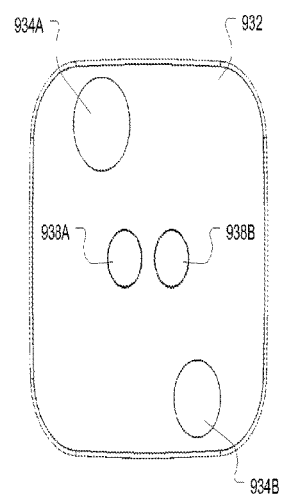

FIGS. 14A-14C are simplified drawings of a PSCM 930 of a configurable EDMPS system 300 according to various embodiments. The PSCM 930 has a TFMEC 933, a BMMEC 932, an EDEEIM 942, a UDSGM 943B, and a user selection element 943A. The TFMEC 933 may include FMCP 935A, B where the opening 935A is larger than the other opening 935B to orient the pair 935A, 935B with a corresponding MMCP, in particular the TIM 970 MMCP 994A, B.

The TFMEC 933 further includes an EECP 944A, B. The EECP 944A, B may be mechanically and electrically couplable to the TIM 970 inner EECP 998A, B. The BMMEC 932 may include MMCP 934A, 934B where the element 934A is larger than the other element 934B to orient the pair 934A, B with a corresponding FMCP. The BMMEC 932 further includes an inner EECP 938A, B. In an embodiment the inner EECP 998A, B may have a lower wattage range (about 5-volt with amperage from 100 mA to 900 mA) where the energy may be generated by an EESE 56A (see FIG. 23, 1130) or passed from the TIM 970 (see FIG. 21, 1110 and FIG. 22, 1120).

The inner EECP 938A, 938B may be mechanically and electrically couplable to the FLGM 810 and LVCM 870 (see FIG. 23, 1130, FIG. 22, 1120). In an embodiment the EDEEIM 942 may be mini-USB compatible, the UDSGM 943B may include at least one light emitting diode (LED) to indicate the PSCM 930 EESE 56A status (charging, level, discharging, external energy provided, data activity on the EDEEIM 942). A user may toggle the selection element 943A to select the UDSGM 943B display mode. The EDEEIM 942 may provide electrical power and data to a PED 30A, 30B coupled to the EDEEIM 942. The PSCM 930 may receive electrical energy from the EECP 944A, B and charge the EESE 56A and provide electrical energy to a module coupled to the EECP 938A, B or a PED 30A, 30B coupled to the EDEEIM 942.

Figure 15A:
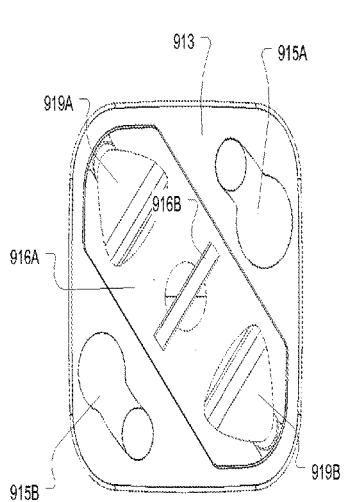
FIGS. 15A-15C are simplified drawings of an headphone storage element of a configurable EDMPS system according to various embodiments.
Figure 15B:
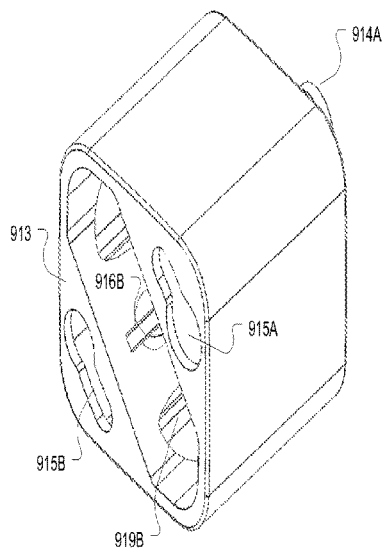
Figure 15C:
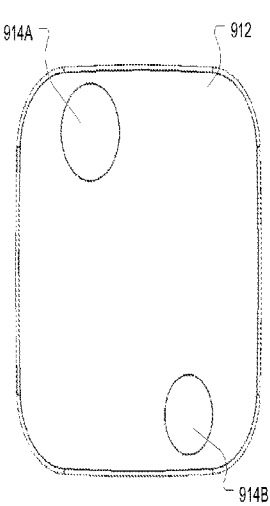

FIGS. 15A-15C are simplified drawings of an headphone storage module 910 of a configurable EDMPS system 800 according to various embodiments. The headphone storage module 910 has a TFMEC 913, a BMMEC 912, a cavity 916A for a headphone spindle 916B, a headphone spindle 916B, and a headset speaker pair 919A, B on the headphone spindle 916B. The TFMEC 973 may include multiple FMCP 915A, B where one opening 915A is larger than the other opening 975B to orient the pair 915A, 915B with a corresponding MMCP. The TFMEC 913 includes the headphone spindle cavity 916A where a user may remove and store the headphone spindle 916B. The headphone spindle 916B may include a tab, headphone brackets and wire spindle below the headphone brackets (similar spindle 570B in FIG. 7). The BMMEC 912 may include MMCP 914A, B where one connector 914A is larger than the other connector 914B to orient the pair 914A, B with another modules 810, 830, 850, 870, 890, 930, 950, 970 corresponding FMCP.

Figure 16A:
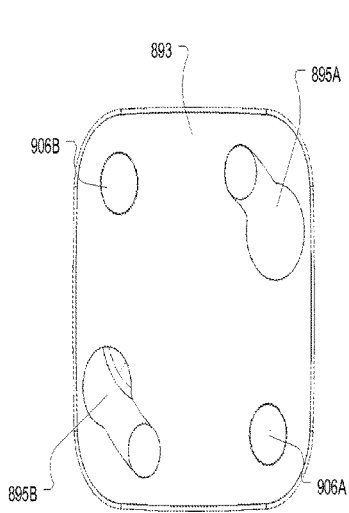
FIGS. 16A-16C are simplified drawings of a high wattage power supply element of a configurable EDMPS system according to various embodiments.
Figure 16B:
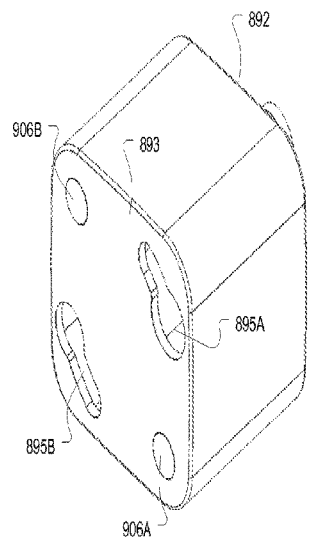
Figure 16C:
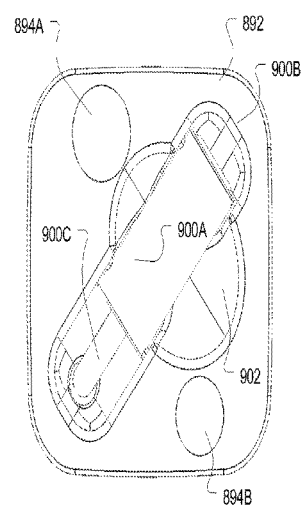

FIGS. 16A-16C are simplified drawings of a HVCM 890 of a configurable EDMPS system 800 according to various embodiments. The HVCM 890 has a TFMEC 893, a BMMEC 892, and an extendable, recessed power tip 900A. The TFMEC 893 may include multiple FMCP 895A, B where one opening 895A is larger than the other opening 895B to orient the pair 895A, B with a corresponding MMCP. The TFMEC 893 further includes an outer EECP 906A, B. The EECP 906A, B may be electrically coupled to the TIM 990 EECP 996A, B. The TIM 990 may provide electrical power to the HVCM 890 via the EECP 996A, B. The TIM 990 may provide about 50-volt, 100 mA to 3 A DC electrical signal to the HVCM 890 when the TIM 990 is coupled to an appropriate PCM 970, 950, 830 (as shown in FIG. 25, 1150).

The BMMEC 892 may include MMCP 894A, B where one connector 894A is larger than the other connector 894B to orient the pair 894A, B with another module 810, 850, 870, 910, 970 FMCP. The BMMEC 892 includes a cavity 902 storing an extendable power tip 900A. The power tip 900A may provide high wattage electrical energy to a high wattage electronic device to enable the device to operate and charge an EESE, the electronic device may be any high wattage electronic device including a laptop, personal data assistant, netbook, camcorder, or other higher wattage device. The HVCM 890 may produce a 50-volt, 100 mA to 3 A electrical signal on the power tip 900A. The power tip may be coupled to a converter tip as required by a related electronic device. The power tip 900A may be electrically coupled to the outer EECP 906A, B via the cable 900C.

Figure 17A:
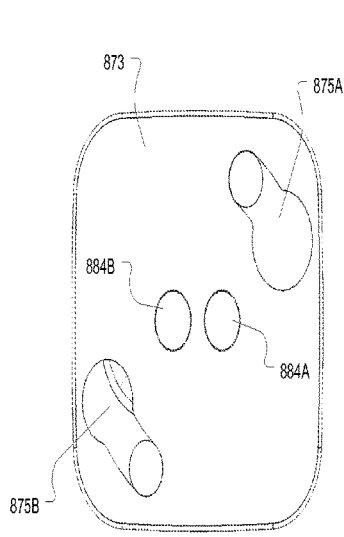
FIGS. 17A-17C are simplified drawings of a low wattage power supply element of a configurable EDMPS system according to various embodiments.
Figure 17B:
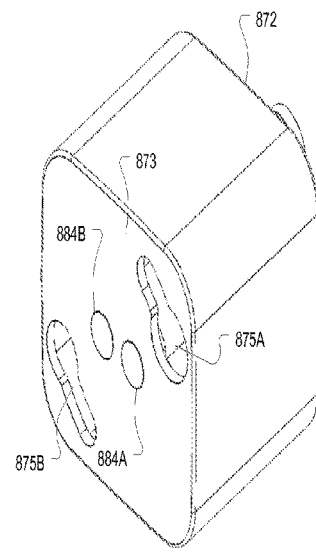
Figure 17C:
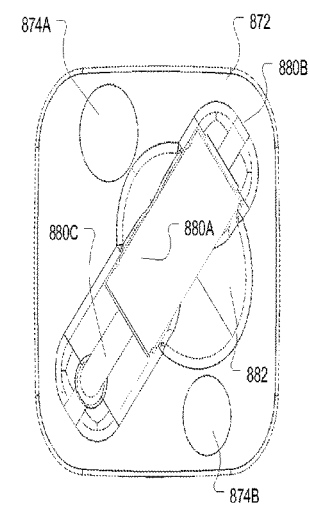

FIGS. 17A-17C are simplified drawings of a LVCM 870 of a configurable EDMPS system 800 according to various embodiments. The LVCM 870 has a TFMEC 873, a BMMEC 872, and an extendable, recessed power tip 880A. The TFMEC 873 may include multiple FMCP 875A, B where one opening 875A is larger than the other opening 875B to orient the pair 875A, B with a corresponding MMCP. The TFMEC 873 further includes an inner EECP 884A, B. The EECP 884A, B may be electrically coupled to the TIM 990 inner EECP 998A, B. The TIM 990 may provide electrical power to the LVCM 870 via the EECP 998A, B. The TIM 990 may provide an about 5-volt, 100 mA to 90 mA DC electrical signal to the LVCM 870 when the TIM 990 is coupled to an appropriate PCM 970, 950, 830 (as shown in FIG. 24, 1140) or PSCM 930 (see FIG. 23, 1130, FIG. 22, 1120).

The BMMEC 872 may include MMCP 874A, B where one connector 874A is larger than the other connector 874B to orient the pair 874A, B with another module 810, 850, 890, 910, 970 FMCP. The BMMEC 872 includes a cavity 882 storing an extendable power tip 880A. The power tip 880A may provide low wattage electrical energy to a low wattage electronic device to enable the device to operate and charge an EESE, the electronic device may be any low wattage electronic device including a cellular phone, electronic reader, personal data assistant, digital camera, camcorder, or other low wattage device. The LVCM 870 may produce a 5-volt, 100 mA to 900 mA electrical signal on the power tip 880A. The power tip may be coupled to a converter tip as required by a related electronic device. The power tip 880A may be electrically coupled to the inner EECP 884A, B via the cable 880C.

Figure 18A:
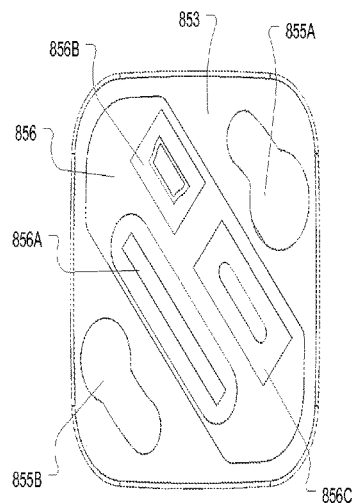
FIGS. 18A-18C are simplified drawings of an USB tip storage element of a configurable EDMPS system according to various embodiments.
Figure 18B:
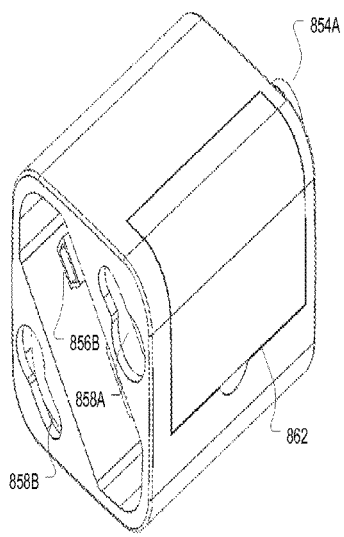
Figure 18C:
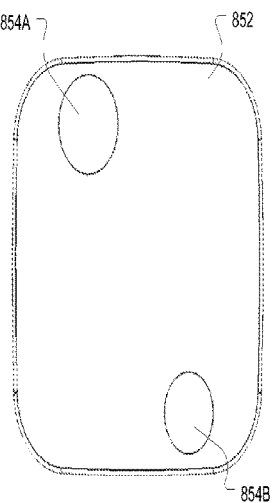

FIGS. 18A-18C are simplified drawings of an EDEEIM or power tip and cable storage module 850 of a configurable EDMPS system 800 according to various embodiments. The EDEEIM or power tip and cable storage module 850 has a TFMEC 853, a BMMEC 852, a cavity 856 for a EDEEIM 1002, 942 or power tip 880A, 900A converters 856A, 856B, 856C, a cavity 862 for storing EDEEIM 1002, 942 or power tip 880A, 900A cables, and EDEEIM 1002, 942 or power tip 880A, 900A converters 856A, 856B, 856C in the cavity 856. The TFMEC 853 may include multiple FMCP 855A, B where one opening 855A is larger than the other opening 855B to orient the pair 855A, B with a corresponding MMCP. The TFMEC 853 includes the EDEEIM 1002, 942 or power tip 880A, 900A cavity 856 where a user may remove and store the EDEEIM 1002, 942 or power tip 880A, 900A converters 856A, 856B, 856C. The EDEEIM or power tip and cable storage module 850 may also include another opening cavity 862 for storing one or more EDEEIM 1002, 942 or power tip 880A, 900A cables. The BMMEC 852 may include MMCP 854A, B where one connector 854A is larger than the other connector 854B to orient the pair 854A, B with another modules 810, 830, 910, 870, 890, 930, 950, 970 corresponding FMCP.

Figure 19A:
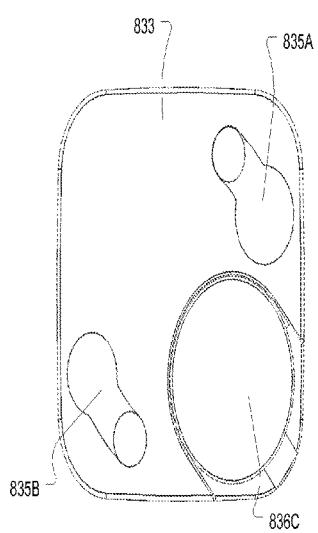
FIGS. 19A-19C are simplified drawings of a 12 volt DC power interface (commonly termed a cigarette lighter interface) element of a configurable EDMPS system according to various embodiments.
Figure 19B:
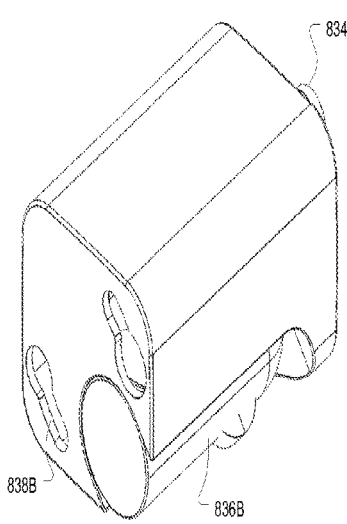
Figure 19C:
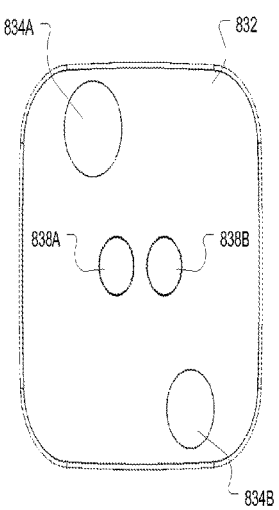

FIGS. 19A-19C are simplified drawings of a 12-volt DC (commonly termed a cigarette lighter interface) PCM 830 of a configurable EDMPS system 800 according to various embodiments. The PCM 830 has a TFMEC 833, a BMMEC 832, an extendable, recessed DC adapter 836B with base/pivot 836C. The TFMEC 833 may include multiple FMCP 835A, B where one opening 835A is larger than the other opening 835B to orient the pair 835A, 975B with a corresponding MMCP. The TFMEC 833 includes the recessed DC adapter 836B base/pivot 836C. A user may rotate the adapter 836B to couple to a corresponding EPS 20A.

The BMMEC 832 may include MMCP 834A, B where one connector 834A is larger than the other connector 834B to orient the pair 834A, B with the TIM 990 or PSCM 930 corresponding FMCP 995A, B or 935A, B. The BMMEC 832 further includes an inner EECP 838A, B. The EECP 838A, B may be electrically coupled to the TIM 990 EECP 1004A, B or PSCM 930 EECP 944A, B. The PCM 830 may provide external electrical power to the TIM 990 EECP 1004A, B or PSCM 930 EECP 944A, B. The PCM 830 may provide an about 12-volt, 100 mA to 900 mA DC electrical signal to the TIM 990 or PSCM 930 when the PCM 930 is coupled to an appropriate EPS 20A and coupled to the TIM 990 or PSCM 930. The TIM 990 BMMEC 992 may be simultaneously coupled to the PSCM 930 (as shown in FIG. 21, 1110), HVCM 890 (FIG. 24, 1140), or LVCM 870 (FIG. 25, 1150). The PSCM 930 may be simultaneously coupled to the LVCM 870 (FIG. 23, 1130).

Figure 20A:
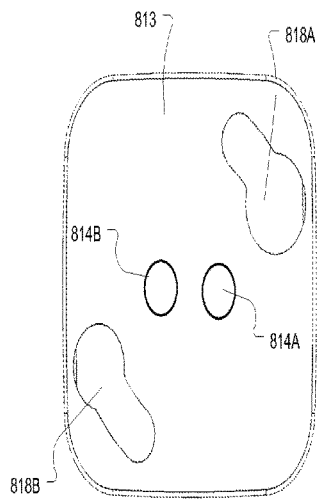
FIGS. 20A-20C are simplified drawings of a light generation device element of a configurable EDMPS system according to various embodiments.
Figure 20B:
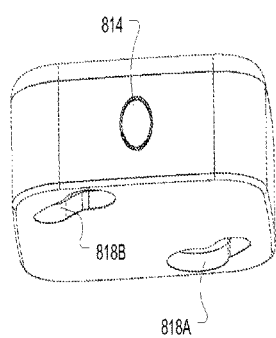
Figure 20C:
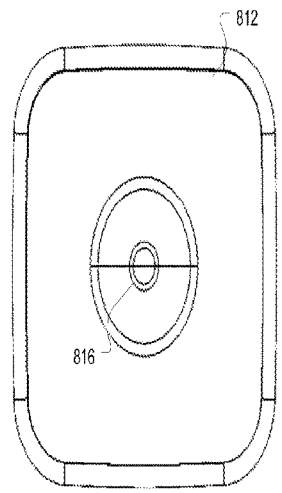

FIGS. 20A-20C are simplified drawings of a FLGM 810 of a configurable EDMPS system 800 according to various embodiments. The FLGM 810 has a TFMEC 813, a BMMEC 812, and a focused light emission device 814. The focused light emission device 814 may include one or more LEDs or other light generation elements. The TFMEC 813 may include multiple FMCP 815A, B where one opening 815A is larger than the other opening 815B to orient the pair 815A, B with a corresponding MMCP (such as the TIM 990 MMCP or PSCM 930 MMCP). The TFMEC 813 includes the EECP 814A, B where the EECP 814A, B may receive a low wattage electrical signal from the TIM 990 or PSCM 930 when coupled to same. The FLGM 810 may use the electrical energy to charge an internal EESE or power the focused light emission device 814 when activated. The BMMEC 812 may include a switch 816 where a user may activate the switch 816 to turn the focused light emission device 814 to an on state, strobe state, or off state in an embodiment. The FLGM 810 may direct energy from an internal EESE 56A or from EECP 814A, B as a function of their state (power on the EECP 814A, B). The focused light emission device 814 may also provide an indication the EESE 56A charge status.

Figure 23:
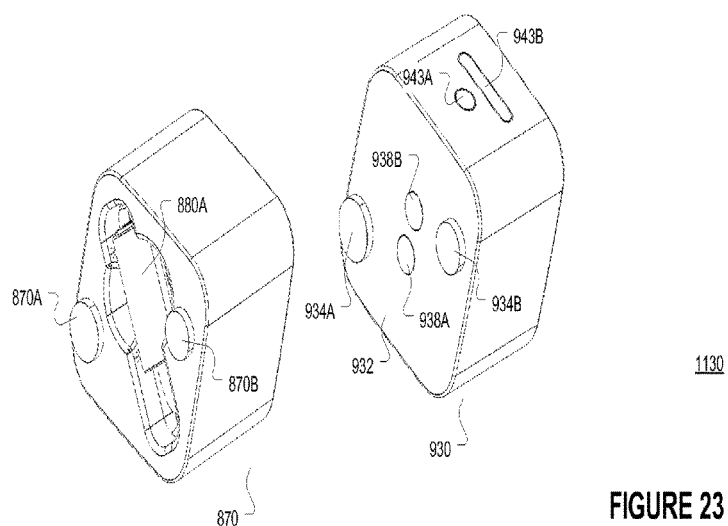
FIGS. 21-25 are simplified drawings of various configurations of the configurable EDMPS system according to various embodiments.
Figure 22:
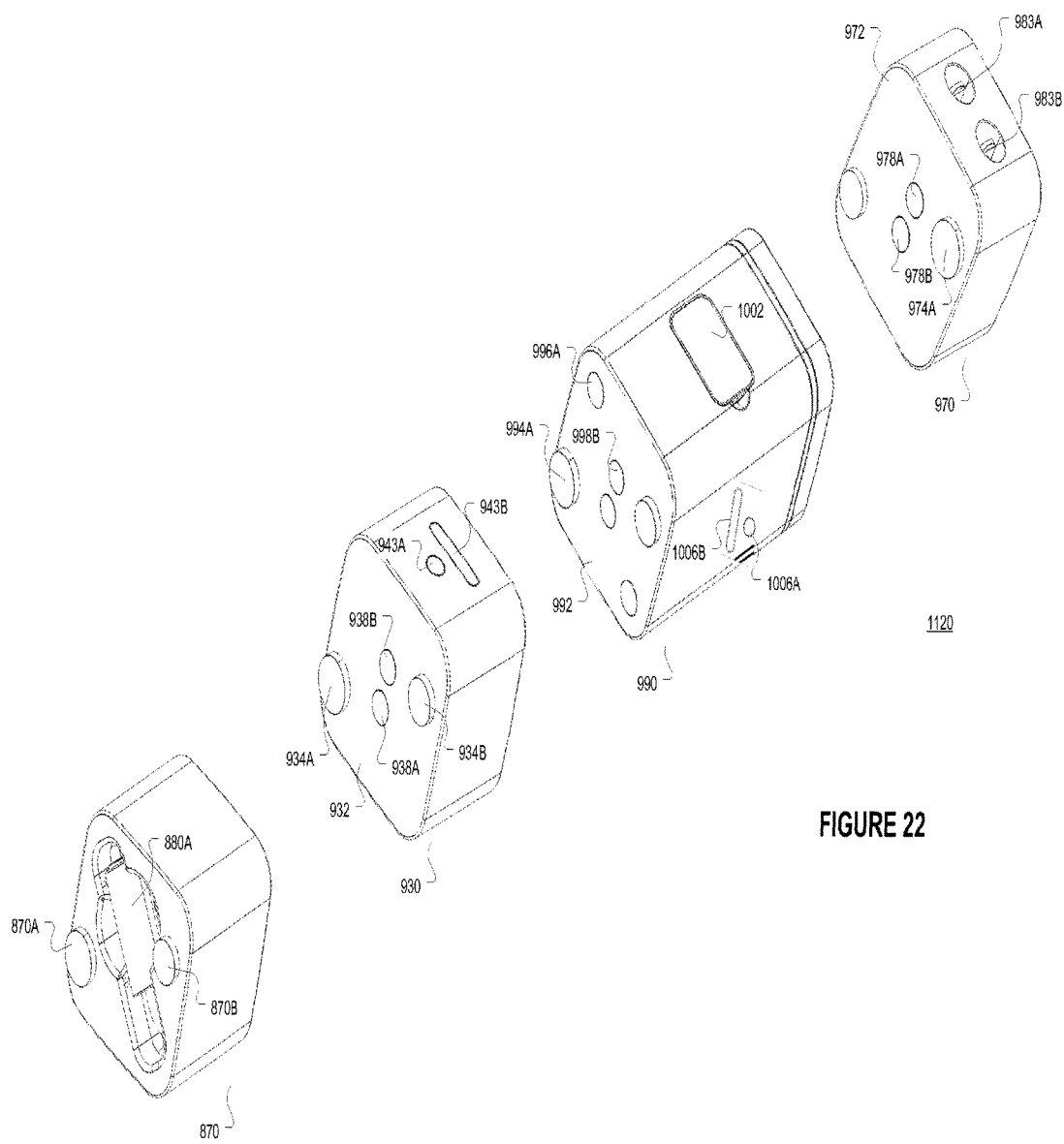
Figure 24:
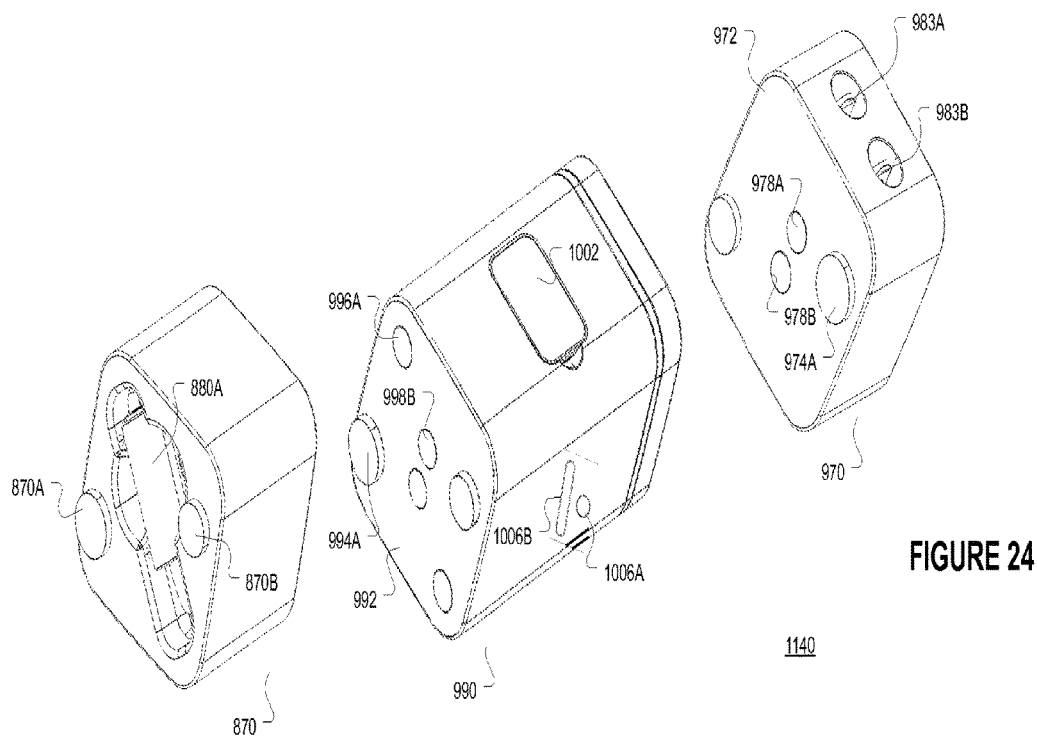
Figure 25:
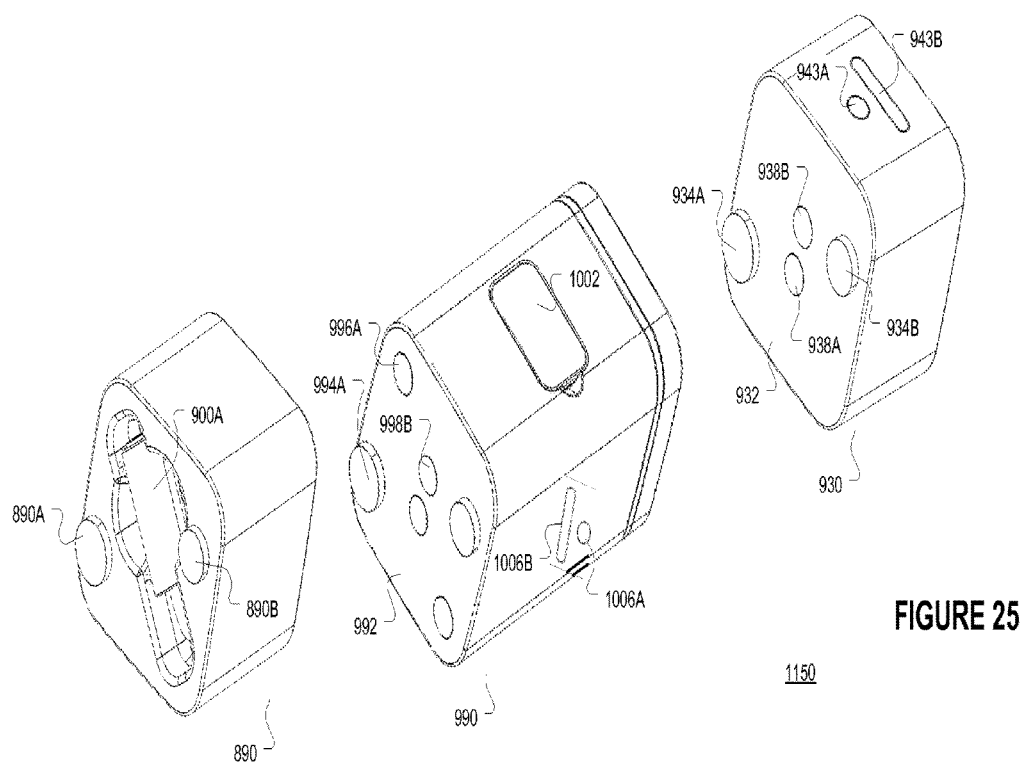

FIGS. 21-24 are simplified drawings of various configurations of the configurable EDMPS system according to various embodiments as referenced above. FIG. 23 is simplified drawings of an EDMPS system 800 including a LVCM 870 coupled directly to a PSCM 930. The PSCM 930 may provide electrical energy to the PWCM 870 from an internal EESE 56A or from a TIM 990 when the PSCM is coupled to the TIM 990 and the TIM 990 is coupled to an PCM 950, 970, or 830 as shown in FIG. 22, 1120. As shown in FIG. 22 a TIM 990 may receive electrical energy from a PCM 970 and provide the electrical energy to the PSCM 930. The PSCM 930 may use the electrical energy to charge an internal EESE 56A and power electrical energy to the LVCM 870. As shown in FIG. 21, 1110, the PSCM 930 may be separately charged by a TIM 990 coupled to a PCM 970. As further shown in FIG. 24, 1140 and FIG. 25, 1150, a LVCM 870 and a HVCM 890 may be directly coupled to a TIM 990 where the TIM 990 is also coupled to a PCM 970.

Any of the components previously described can be implemented in a number of ways, including embodiments in software. Any of the components previously described can be implemented in a number of ways, including embodiments in software.

The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

What is claimed is:

1. An apparatus, comprising:
  a first electrical power coupling module comprising:
    a first electrical interface for coupling with a first type of external power source providing a first electric signal;
    a first connector; and
    a first electric coupler electrically connected to the first electrical interface;
  a charger, comprising:
    a second electric coupler;
    a second connector configured to form a mechanical and/or magnetic coupling with the first connector comprising the first electric power coupling module, the formation of mechanical and/or magnetic coupling between the first connector and the second connector further forming an electric coupling the first electric coupler and the second electric coupler;
    a third electric coupler;
  a power converter detachably coupled with the charger, the power converter configured to convert the first electric signal at the second electric coupler of the charger to a second electric signal at the third electric coupler at the charger, the first electric signal having a different voltage than the first electric signal;
  a second electrical interface for coupling the apparatus to an electronic device, the electronic device configured to electrically couple with a second type of external power source providing the second electric signal; and
  an electrical energy storage element that is electrically couplable to the third electric coupler of the charger, the electrical energy storage element being charged by the charger when the electrical energy storage is electrically coupled to the third electric coupler of the charger.

2. The apparatus of claim 1, further comprising:
  a data memory storage interface electrically couplable with the electronic device electric interface.

3. The apparatus of claim 1, wherein the electrical energy storage element includes a fourth electric coupler for forming an electric coupling with the third electric coupler of the charger.

4. The apparatus of claim 1, wherein the power converter includes a transformer configured to increase and/or decrease a voltage of the first electric signal.

5. The apparatus of claim 1, wherein the power converter includes an inverter.

6. The apparatus of claim 5, wherein the first electric signal comprises an alternating current and the second electric signal comprises a direct current.

7. The apparatus of claim 1, wherein the first electrical power coupling module is detachably coupled with the charger.

8. The apparatus of claim 1, further comprising:
  a second electrical power coupling module comprising:
    a third electrical interface for coupling with a third type of external power source;
    a third connector; and
    a fourth electric coupler.

9. The apparatus of claim 8, wherein the second electrical power coupling module is detachably coupled with the first electrical power coupling module and/or the charger.

10. The apparatus of claim 8, wherein the second electrical power coupling module is electrically coupled with the charger instead of and/or in addition to the first electrical power coupling module.

* * * * *